United States Patent [19]
Hogaki et al.

[11] Patent Number: 5,996,921
[45] Date of Patent: Dec. 7, 1999

[54] CENTRIFUGAL BRAKING APPARATUS FOR BAITCASTING REEL

[75] Inventors: Toshihiko Hogaki; Atsuhito Okada; Masayuki Yamamoto; Yoji Yamada; Noboru Nakanishi, all of Fuchu, Japan

[73] Assignee: Ryobi Limited, Japan

[21] Appl. No.: 09/035,581

[22] Filed: Mar. 5, 1998

[30] Foreign Application Priority Data

| Mar. 6, 1997 | [JP] | Japan | ................................. 9-051910 |
| Sep. 10, 1997 | [JP] | Japan | ................................. 9-245248 |
| Sep. 10, 1997 | [JP] | Japan | ................................. 9-245249 |

[51] Int. Cl.$^6$ .................................................. A01K 89/02
[52] U.S. Cl. ........................ 242/289; 242/288; 242/309; 242/322; 182/239; 188/181 A
[58] Field of Search .................................. 242/286, 288, 242/289, 291, 292, 309, 322; 188/181 A, 184, 185, 186; 182/234, 239

[56] References Cited

U.S. PATENT DOCUMENTS

| 655,815 | 8/1900 | Vernaz | ..................................... 188/186 |
| 2,829,754 | 4/1958 | Norcross | .................................. 188/184 |
| 2,967,676 | 1/1961 | Klingberg | ................................ 242/289 |
| 3,598,204 | 8/1971 | Davis | ................................... 188/181 X |
| 3,944,160 | 3/1976 | Cooper | ..................................... 242/289 |
| 4,195,721 | 4/1980 | Shea | ..................................... 188/184 X |
| 4,390,140 | 6/1983 | Karlsson et al. | ......................... 242/289 |
| 4,580,742 | 4/1986 | Moosberg et al. | ....................... 242/288 |
| 4,618,106 | 10/1986 | Noda | .................................. 242/291 X |
| 5,273,235 | 12/1993 | Sato | ......................................... 242/288 |
| 5,301,899 | 4/1994 | Sato | ......................................... 242/288 |
| 5,542,619 | 8/1996 | Karlsson | ............................. 188/184 X |
| 5,848,781 | 12/1998 | Kulhavy et al. | .................... 188/185 X |

*Primary Examiner*—Donald P. Walsh
*Assistant Examiner*—Emmanuel M. Marcelo
*Attorney, Agent, or Firm*—Brooks & Kushman P.C.

[57] ABSTRACT

A centrifugal braking apparatus for a baitcasting reel comprises a spool, pivot shafts, brake levers, and a ring-shaped braking member. The spool is rotatably supported between both side plates of a reel main body. Each of the pivot shafts is disposed on the spool so as to be arranged apart from a rotation axis of the spool in a radius direction thereof and extended at right angles to a straight line parallel with the rotation axis of the spool. Each of the brake levers has a tip end portion and a root end portion that is pivotably supported by the pivot shaft so that the tip end portion of the brake lever is movable toward a standard plane, which includes a central axis of the pivot shaft and is perpendicular to the rotation axis of the spool, under a function of centrifugal force produced by rotation of the spool. The ring-shaped braking member is provided on the reel main body so that the tip end portion of the brake lever can be brought into contact with the ring-shaped braking member.

8 Claims, 13 Drawing Sheets

F I G. 15
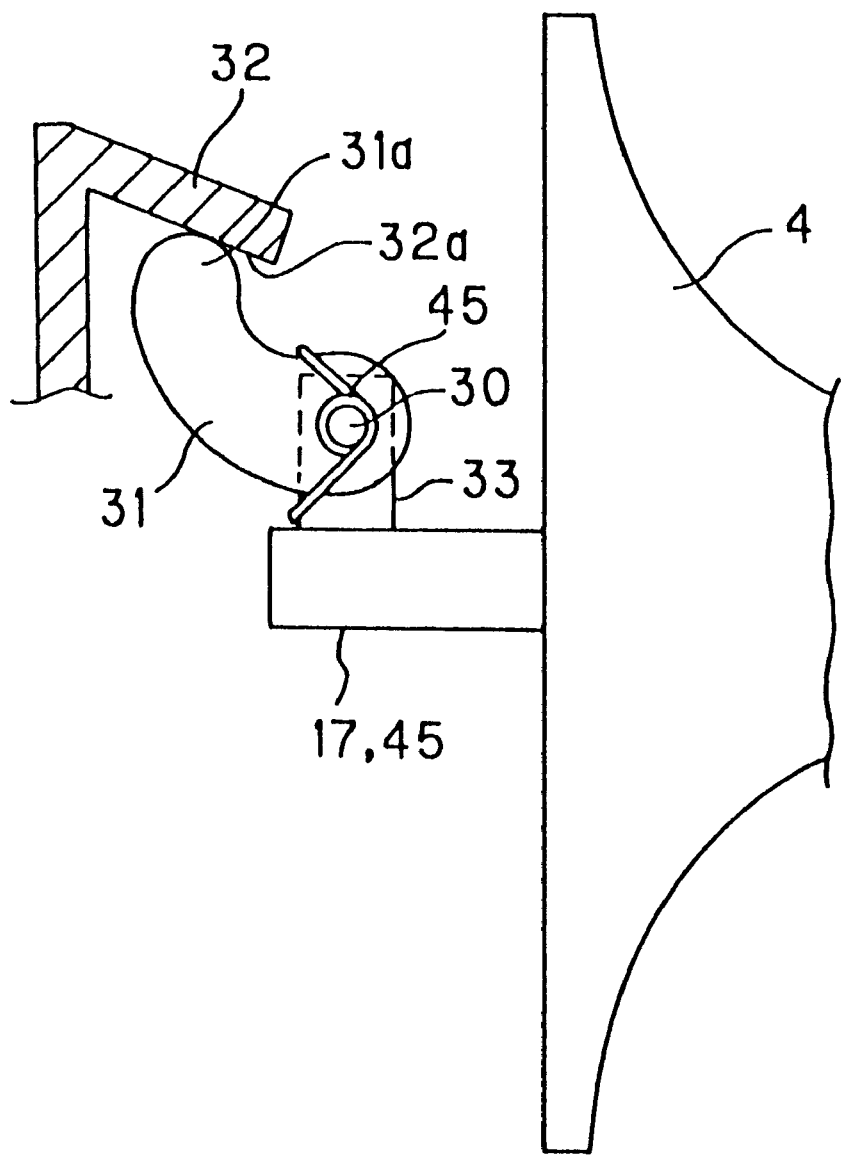

F I G. 16
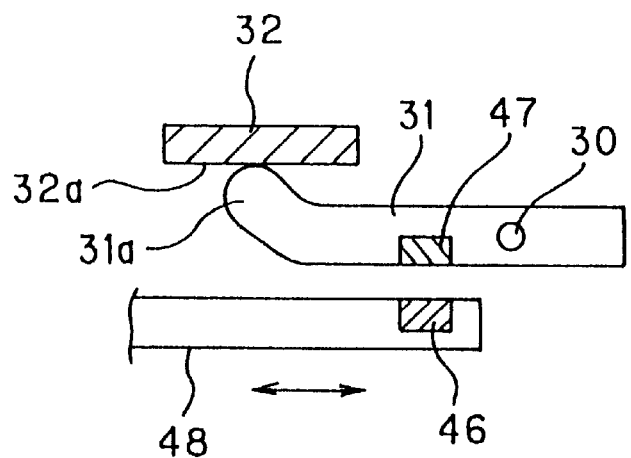
F I G. 17
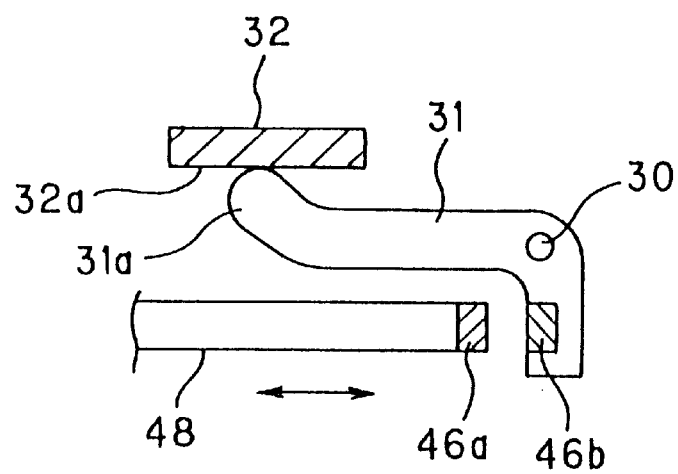

F I G. 19
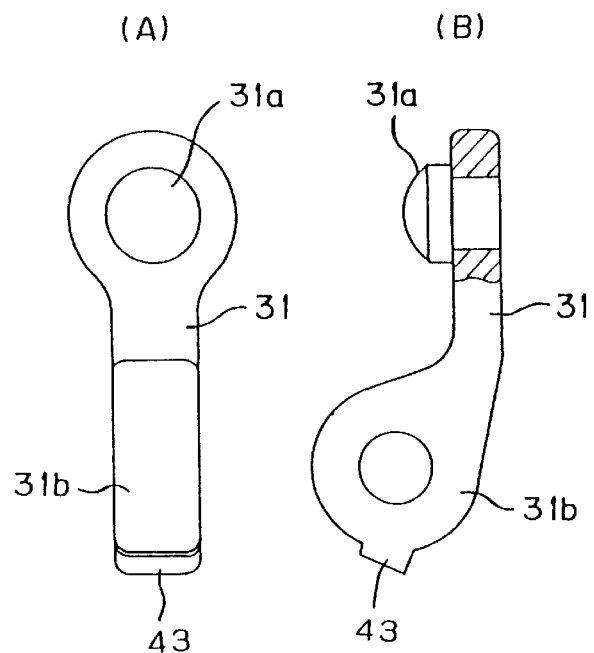
F I G. 20
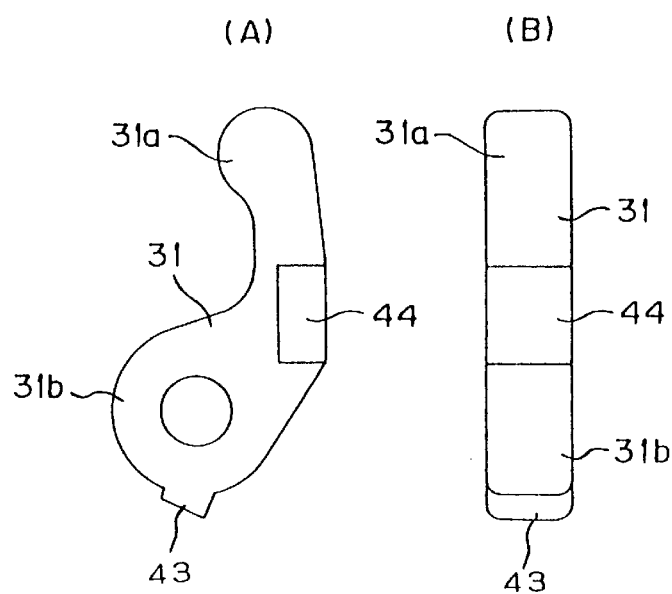

CENTRIFUGAL BRAKING APPARATUS FOR BAITCASTING REEL

BACKGROUND OF THE INVENTION

1. Field of the Invention

The present invention relates to a centrifugal braking apparatus for a baitcasting reel.

2. Description of the Related Art

There has conventionally been known a centrifugal braking apparatus for a baitcasting reel, in which a spool is prevented from being overrun to avoid an occurrence of backlash by slidably disposing brake weights along guide pins or guide grooves which is radially provided on one end of the spool so that the brake weights can come into contact with the inner peripheral surface of a brake drum provided on a reel main body under a function of centrifugal force produced by rotation of the spool.

In such a conventional centrifugal braking apparatus, the contact position of the brake weights with the brake drum is limited due to the slide of the brake weights in a radial direction, thus causing a problem of uneasy adjustment of the braking force. The brake weights located in its lower position may fall out from the guide pins or grooves, when assembling steps of the baitcasting reel are carried out, thus causing an undesirable problem.

Japanese Patent Provisional Publication No. S57-22,637 discloses a baitcasting reel having a centrifugal braking apparatus, in which levers each having a pair of opposite outer and inner arms are disposed on one end of the spool by means of pivot shafts which are perpendicular to the rotation axis of the spool, respectively, in order to solve the above-mentioned problem. The above-mentioned lever is swung, along with the rotation of the spool, around the pivot shaft located between the opposite outer and inner arms of the lever, under the function of its outer arm acting as a weight, so that the inner arm can come into contact with the braking member disposed on the reel main body, thus causing the braking force.

However, in the braking apparatus of the above-described Japanese Patent Provisional Publication No. S57-22,637, it is hard to make fine adjustment of the braking force, thus making it impossible to obtain an optimum braking force, since the contact position of the lever having the opposite outer and inner arms with the braking member is located in the vicinity of the rotation axis of the spool.

SUMMARY OF THE INVENTION

An object of the present invention is therefore to provide a centrifugal braking apparatus for a baitcasting reel, which permits fine adjustment of the braking force, thus making it possible to obtain an optimum braking force.

In order to attain the aforementioned object, a centrifugal braking apparatus for a baitcasting reel, which comprises:

a spool rotatably supported between both side plates of a reel main body;

at least one pivot shaft disposed on said spool so as to be arranged apart from a rotation axis of said spool in a radius direction thereof and extended at right angles to a straight line parallel with the rotation axis of said spool;

at least one brake lever each having a tip end portion and a root end portion that is pivotably supported by said at least one pivot shaft, respectively, so that said tip end portion of said brake lever is movable toward a standard plane, which includes a central axis of said pivot shaft and is perpendicular to the rotation axis of said spool, under a function of centrifugal force produced by rotation of said spool; and a ring-shaped braking member provided on said reel main body so that the tip end portion of said brake lever, which is swung under the function of the centrifugal force produced by rotation of said spool can be brought into contact with said ring-shaped braking member.

The brake lever may be provided with a swing-regulating means for making regulation of a swing motion of the brake lever under the function of the centrifugal force produced by the rotation of the spool.

The swing-regulating means may comprise one of a magnet and a member to be attracted thereby, which is provided on the brake lever; and an other of the magnet and the member to be attracted thereby, which is provided on a portion of the reel main body, which faces the one of the magnet and the member to be attracted thereby.

At least a contact surface of the tip end portion of the brake lever, which is to be brought into contact with the braking member may be formed of any one of hard rubber and hard synthetic resin.

The tip end portion of the brake lever may be positioned between an end surface of the spool and the standard plane so that the tip end portion of the brake lever can be moved toward the standard plane, to be brought into contact with a side surface of the ring-shaped braking member under the function of the centrifugal force produced by rotation of the spool.

The brake lever may have center of gravity, which exists beyond a straight line connecting the central axis of the pivot shaft and the tip end portion of the brake lever and dividing the brake lever into a spool-side area and a reel-main-body-side area, and exists on the spool-side area; and the tip end portion of the brake lever may be movable beyond the standard plane under the function of the centrifugal force produced by rotation of the spool to be brought into contact with the braking member.

The braking member with which the tip end portion of the brake lever is to be brought into contact may be disposed on the reel main body by means of a braking member-adjusting means for making a position adjustment of the braking member in a direction of the rotation axis of the spool.

The pivot shaft by which the brake lever is pivotably supported may be disposed on the spool so as to be revolvable, along with rotation of the spool, around the rotation axis of the spool and to be slidable in a direction of the rotation axis thereof; and the pivot shaft may be disposed on the reel main body by means of a pivot shaft-adjusting means for making a position adjustment of the pivot shaft in a direction of the rotation axis of the spool.

The tip end portion of the brake lever may be positioned between the braking member and the rotation axis of the spool so that the tip end portion of the brake lever can be moved toward the ring-shaped braking member, to be brought into contact with an inner peripheral surface of the braking member under the function of the centrifugal force produced by rotation of the spool.

The braking member with which the tip end portion of the brake lever is to be brought into contact may be disposed on the reel main body by means of a braking member-adjusting means for making a position adjustment of the braking member in a direction of the rotation axis of the spool; and the braking member may have a tapered inner surface, a diameter of which is gradually increased in a direction of the rotation axis of the spool.

The pivot shaft by which the brake lever is pivotably supported may be disposed on the spool so as to be revolvable, along with rotation of the spool, around the rotation axis of the spool and to be slidable in a direction of the rotation axis thereof; the pivot shaft may be disposed on the reel main body by means of a pivot shaft-adjusting means for making a position adjustment of the pivot shaft in a direction of the rotation axis of the spool; and the braking member may have a tapered inner surface, a diameter of which is gradually increased in a direction of the rotation axis of the spool.

BRIEF DESCRIPTION OF THE DRAWINGS

FIG. 15 is a partial sectional-view illustrating a centrifugal braking apparatus of the eleventh embodiment of the present invention;

FIG. 16 is a partial sectional-view illustrating a centrifugal braking apparatus of the twelfth embodiment of the present invention;

FIG. 17 is a partial sectional-view illustrating a centrifugal braking apparatus of the thirteenth embodiment of the present invention;

FIG. 19(A) is a front view illustrating a modified brake lever used in a centrifugal braking apparatus of the fifteenth embodiment of the present invention, and FIG. 19(B) is a side view having a partial cross-section, illustrating the brake lever as shown in FIG. 19(A); and FIG. 20(A) is a front view illustrating a modified brake lever used in a centrifugal braking apparatus of the sixteenth embodiment of the present invention, and FIG. 20(B) is a side view illustrating the brake lever as shown in FIG. 20(A).

DETAILED DESCRIPTION OF THE PREFERRED EMBODIMENTS

Now, embodiments of a centrifugal braking apparatus for a baitcasting reel of the present invention will be described in detail below with reference to the accompanying drawings.

First Embodiment

Figure 1:
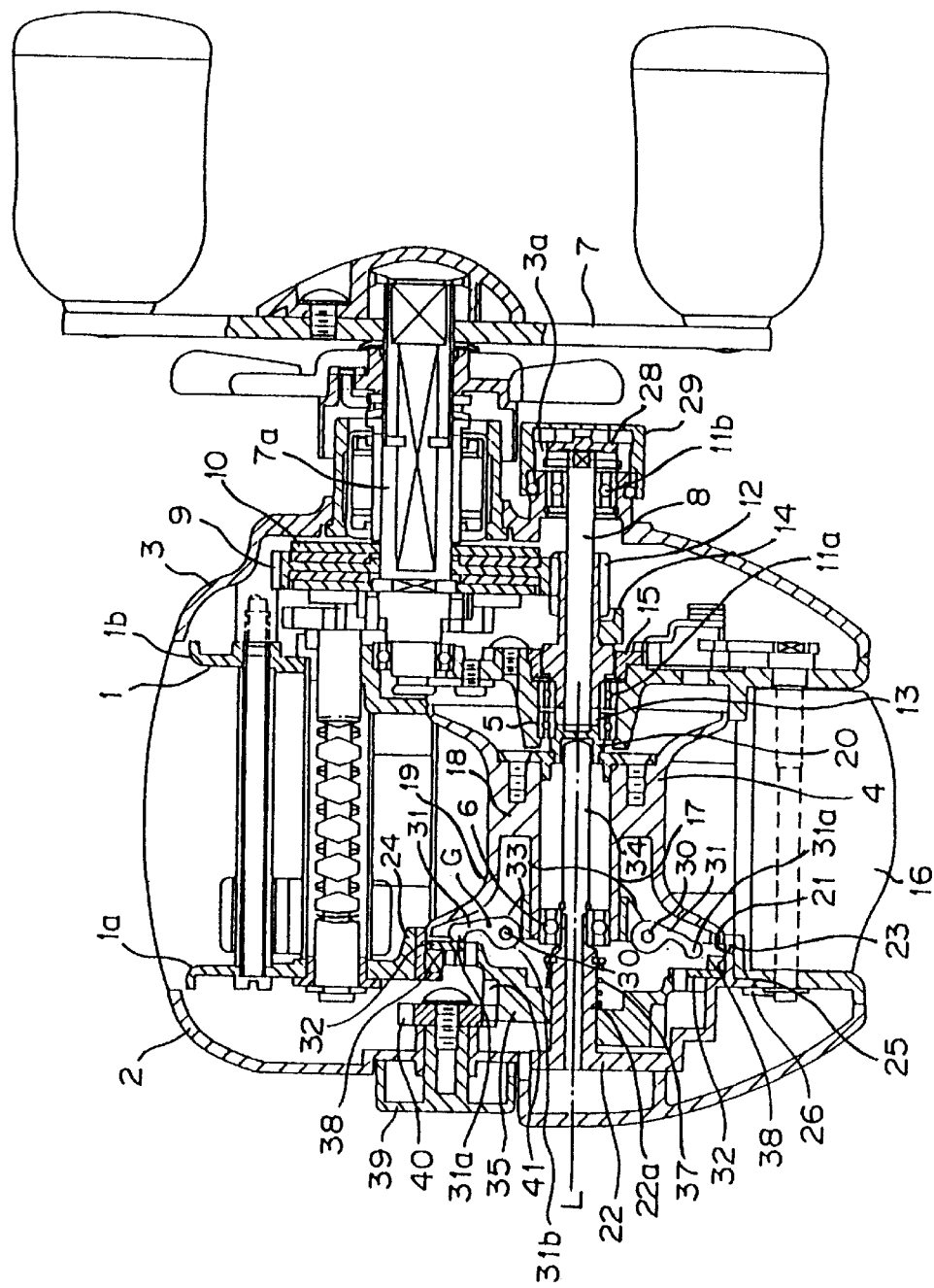
FIG. 1 is a horizontal cross-sectional view illustrating a baitcasting reel provided with a centrifugal braking apparatus of the first embodiment of the present invention.

A baitcasting reel for fishing is provided with a reel frame body 1 having left and right-hand frame plates 1a, 1b, to which side plates 2, 3 are secured, respectively, as shown in FIG. 1. A spool 4 on which a fishing line is to be wound is rotatably supported between the right-hand frame plate 1b and the left-hand side plate 2.

The spool 4 is connected to a handle 7 through a driving force transmission means described below so as to be rotatable by means of the handle 7. More specifically, a handle shaft 7a and a pinion shaft 8 are rotatably supported in parallel with each other between the frame plate 1b and the side plate 3. The handle 7 is stationarily secured to the above-mentioned handle shaft 7a, the intermediate portion of which has a master gear 9 put thereon through a drag mechanism 10 and the other components, so that the turning of the handle 7 causes the rotation of the master gear 9 through frictional resistance of the drag mechanism 10.

The pinion shaft 8 is arranged on an extended line of the rotational axial line L of the spool 4, and the left-hand end of the pinion shaft 8 is supported on the right-hand frame plate 1b through the bearing 11a, and the right-hand end thereof is supported on the side plate 3 through the bearing 11b. A pinion 12 is put on the above-mentioned pinion shaft 8 so as to be rotatable and slidable thereon, and the pinion 12 is engaged with the above-mentioned master gear 9.

A meshing portion 13 is provided between the left-hand end of the pinion 12 and the right-hand end of the spool 4. The meshing portion 13 which comprises any one of male and female portions formed on the left-hand end of the pinion 12 and the other of the male and female portions formed on the right-hand end of the spool 4, is constructed so that the engagement of the pinion 12 with the spool 4 and the disengagement thereof from the spool 4 can selectively be made by sliding the pinion 12 on the pinion shaft 8 by means of a shifter 14, along with the clockwise or counter-clockwise turn of a clutch cam 15 caused by the operation of a clutch mechanism described later.

The engagement of the pinion 12 with the spool 4 by means of the meshing portion 13 to keep the clutch mechanism in an "ON" condition causes inhibition of free rotation of the spool 4 to maintain a condition in which the fishing line cannot be paid out from the spool 4. In such a condition, when the handle 7 is turned in the winding direction of the fishing line, the force given by the turning of the handle 7 is transmitted to the handle shaft 7a, the master gear 9 and the pinion 12 in this order, to cause the spool 4 to be rotated, thus making it possible to wind the fishing line onto the spool 4.

The disengagement of the pinion 12 from the spool 4 by means of the meshing portion 13 to keep the clutch mechanism in an "OFF" condition causes the spool 4 to be freely rotated to maintain the other condition in which the fishing line can be paid out from the spool 4. In such a condition, a casting operation can be carried out to pay out the fishing line from the spool 4 by the weight of rigs such as a lure, a sinker or the like.

The above-mentioned pinion 12 may be arranged rotatably and slidably between the right-hand frame plate 1b and the right-hand side plate 3 by means of bearings respectively provided on these plates 1b, 3, without being put on the pinion shaft 8 mentioned above. Although the pinion shaft 8 is described to be supported by the right-hand frame plate 1b and the right-hand side plate 3, the pinion shaft 8 may be supported by means of the other member separately secured to the right-hand frame plate 1b or the right-hand side plate 3.

The clutch mechanism comprises the known switching device described below. The pinion 12 is fitted into the clutch cam 15 so that the latter can be rotated relative to the former. The clockwise or counterclockwise turn of the clutch cam 15 around the pinion shaft 8 causes the shifter 14 to be slid along the pinion shaft 8 to selectively make the engagement of the pinion 12 with the spool 4 or the disengagement thereof from the spool 4, thereby permitting the transmission of the force given by the turning of the handle 7 to the spool 4 or the release of the transmission thereof.

The shifter 14 is constructed so as to be slidable on the pinion shaft 8 in the axial direction thereof by means of a pin (not shown) provided in the reel frame body 1. A coil spring (not shown) for imparting the constant pressing force to the pinion 12 through the shifter 14 is fitted to the above-mentioned pin so that the engagement of the pinion 12 with the spool 4 by means of the meshing portion 13 can be maintained.

The clutch cam 15 is formed as a solid cam, which is rotatably supported on the right-hand frame plate 1b in the vicinity of the pinion 12. The clutch cam 15 is connected to a clutch lever 16 swingably supported between the left-hand frame plate 1a and the right-hand frame plate 1b so as to be operatable by means of the clutch lever 16.

According to the above-described construction, the shifter 14 is kept in a position as shown in FIG. 1 under a function of resiliency of the above-mentioned coil spring (not shown), thus making the engagement of the pinion 12 with the spool 4 by means of the meshing portion 13, unless the clutch lever 16 is pushed down for example by a finger. As a result, the turning of the handle 7 in this condition causes the spool 4 to be rotated in the winding direction.

When the clutch lever 16 is pushed down by means of a finger, the clutch cam 15 is turned, and the shifter 14 is shifted in the right-hand direction in FIG. 1 against the resiliency of the coil spring by means of the cam of the clutch cam 15, to move the pinion 12 in the same direction. As a result, the disengagement of the pinion 12 from the spool 4 by means of the meshing portion 13 is made, thus maintaining a condition in which the spool 4 can freely be rotated. In such a condition, a casting operation can be carried out to pay out the fishing line from the spool 4 by the weight of rigs such as a lure, a sinker or the like.

As shown in FIG. 1, the above-mentioned spool 4 is composed of a tubular shaft 17 and a fishing line-winding portion formed into a hollow cylindrical shape (i.e., a drum-shape), which is coaxially arranged around the tubular shaft 17 and connected thereto by a leg portion 18. The tubular shaft 17 has at its right-hand end a support piece 20 fixed thereto, which is supported on the right-hand frame plate 1b through a bearing 5. The left-hand end of the tubular shaft 17 is supported on the left-hand side plate 2 through a bearing 6. Accordingly, the spool 4 is rotatable by supporting the both ends of the tubular shaft 17 by the bearings 5, 6.

Figure 2:
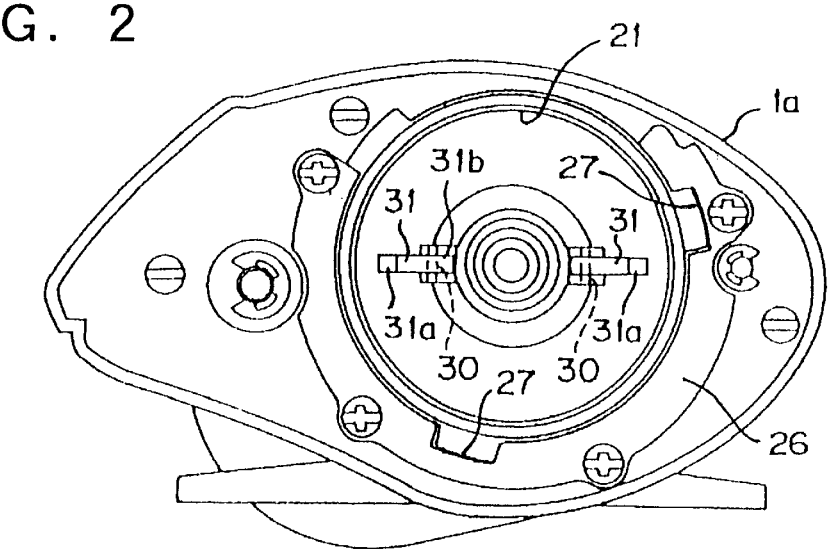
FIG. 2 is a side view of the baitcasting reel as shown in FIG. 1, from which a left-hand side plate is removed.

The above-described spool 4 can be removed from the position between the both frame plates 1a, 1b of the reel frame body 1 in the following manner. More specifically, the support piece 20 at the right-hand end of the spool 4 is inserted into the inner ring of the bearing 5, so as to be removable therefrom. A spool-inserting opening 21 having a diameter slightly larger than the outer diameter of the flange portion of the spool 4 is formed in the left-hand frame plate 1a, and the left-hand side plate 2 is detachably secured to the left-hand frame plate 1a by means of a detachably securing means, as shown in FIGS. 1 and 2.

The left-hand frame plate 1a has, on its portion on which the above-mentioned detachably securing means is arranged, a ring-shaped frame portion 22 integrally formed with the left-hand frame plate 1a. The ring-shaped frame portion 22 has on its periphery a rim 23, which is to be fitted into another rim 24 formed on the periphery of the spool-inserting opening 21 of the left-hand frame plate 1a.

The detachably securing means is composed of engaging projections 25 radially projected from the periphery of the rim 24 of the ring-shaped frame portion 22, and an arch-shaped rocking member 26 having cutouts 27 corresponding to the engaging projections 25, which is disposed around the spool-inserting opening 21 of the left-hand frame plate 1a so that the engaging projections 25 can engage with or disengage from the rocking member 26. The left-hand side plate 2 can be secured to the left-hand frame plate 1a by inserting the engaging projections 25 of the side plate 2 into the cutouts 27 of the rocking member 26 and turning the side plate 2 in one direction relative to the frame plate 1a. The left-hand side plate 2 can be removed from the left-hand frame plate 1a by turning the side plate 2 in the opposite direction relative to the frame plate 1a and pulling out the side plate 2 from the frame plate 1a. Removal of the side plate 2 from the frame plate 1a causes the spool-inserting opening 21 to be exposed, thus permitting the spool 4 to be removed from the spool-inserting opening 21.

A braking force can be applied to the spool 4 by means of a mechanical braking apparatus described below. The mechanical braking apparatus utilizes the pinion shaft 8 to impart a braking force to the spool 4. The pinion shaft 8 is designed as a movable shaft which is movable on the extended line of the rotation axis "L" of the spool 4 by means of a position adjusting means disposed on the right-hand side plate 3. The spool 4 is held between one end of the above-mentioned movable shaft (i.e., the pinion shaft 8) and the left-hand side plate 2 which faces the end of the movable shaft.

The position adjusting means comprises a leaf spring 28 arranged at the right-hand end of the pinion shaft 8 which passes through the right-hand side plate 3, and an adjusting knob 29 having a box nut-shape, which is engaged with the boss 3a formed on the right-hand side plate 3 so as to cover the leaf spring 28 and the right-hand end of the pinion shaft 8. The clockwise or counterclockwise turning of the adjusting knob 24 causes change in resilient force applied by the leaf spring 28, to increase or decrease force by which the spool 4 is held between the pinion shaft 8 and the left-hand side plate 2, thus adjusting a braking force applied to the spool 4. Such a braking force may attenuate a rotational inertia force of the spool 4 during paying out the fishing line from the spool 4, resulting in prevention of occurrence of backlash.

The baitcasting reel is provided with a spool-braking means between the left-hand end of the spool 4 and the left-hand side plate 2 opposing thereto, in addition to the above-described mechanical braking apparatus.

The spool-braking means is constructed as a centrifugal braking apparatus, which comprises brake levers 31 and a ring-shaped braking member 32 as shown in FIGS. 1 and 2. Each of the brake levers 31 has a tip end portion and a root end portion that is pivotably supported by a pivot shaft 30. The pivot shaft 30 is disposed on the spool 4 rotatably supported between the both side plates 1a, 1b of the reel main body. The pivot shaft 30 is arranged apart from the rotation axis L of the spool 4 in a radius direction thereof and extended at right angles to a straight line parallel with the rotation axis L of the spool 4. The ring-shaped braking member 32 is disposed on the above-mentioned left-hand side plate 2 so that the brake lever 31 swung under the function of the centrifugal force produced by rotation of the spool 4 can be brought into contact with the ring-shaped braking member 32.

The pivot shaft 30 is secured to a bracket 33 fixed on the outer periphery of the one end of the tubular shaft 17 of the spool 4. There are provided two pivot shafts 30 at the opposite two positions on the tubular shaft 17 with the rotation axis L of the spool 4 as a central line, and the two pivot shafts 30 are secured to these pivot shafts 30, respectively. Each of the pivot shafts 30 is perpendicular to the rotation axis L of the spool 4, and each of the brake levers 31 can therefore be swung along a plane including the rotation axis L.

The brake lever 31 is swung under the function of the centrifugal force produced by rotation of the spool 4, to cause the tip end portion 31a of the brake lever 31 to be moved from the side of the spool 4 to the side of the left-hand side plate 2. The brake lever 31 is formed into a curved-shape so that the intermediate portion connecting the root end portion 31b and the tip end portion 31a projects toward the opposite side to the braking member 32. As a result, the tip end portion 31a of the brake lever 31 can come into contact with the side surface of the braking member 32 without causing the above-mentioned intermediate portion to come into contact with the inner peripheral edge portion of the braking member 32.

Center gravity G of the brake lever 31 exists beyond a plane P, which includes the central axis of the pivot shaft 30 and is perpendicular to the rotation axis L of the spool 4, and is located in the opposite area of the brake lever 31 to the braking member 32. The brake lever 31 can be swung under the function of the centrifugal force produced by rotation of the spool 4 to cause the tip end portion 31a of the brake lever 31 to come into contact with the ring-shaped braking member 32 to impart a braking force to the spool 4, which is in proportion to magnitude of the above-mentioned centrifugal force.

The tip end portion 31a of the brake lever 31 is oriented along the radial direction extending from the rotation axis L of the spool 4. More specifically, the tip end portion 31a of the brake lever 31 is away outward from the pivot shaft 30. It is therefore possible to increase a centrifugal force imparted to the brake lever 31 during the rotation of the spool 4, thus leading to increase in braking torque applied to the braking member 32.

Figure 3:
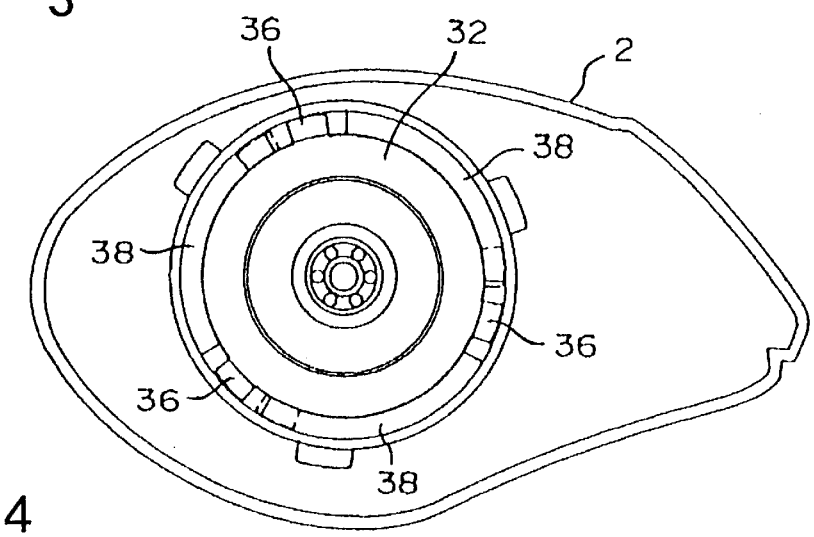
FIG. 3 is a side view of the left-hand side plate removed from the baitcasting reel as shown in FIG. 2.

The above-mentioned ring-shaped braking member 32 is disposed on the left-hand side plate 2 by means of a braking member-adjusting means so that a position of the braking member 32 is adjustable in a direction of the rotation axis L of the spool 4 in the following manner. More specifically, as shown in FIGS. 1 and 3, a shaft-shaped spool-supporting member 34 is disposed at the central portion of the ring-shaped frame portion 22 of the left-side plate 2. The spool-supporting member 34 rotatably supports the spool 4 by causing the spool-supporting member 34 to passes through the tubular shaft 17 of the spool 4 and arranging a bearing 6 between the tubular shaft 17 and the spool-supporting member 34. The spool-supporting member 34 is removable from the tubular shaft 17.

A disc 35 is disposed on a boss-shaped base portion 22a for the spool-supporting member 34 so as to be slidable along the central axis thereof. The above-mentioned ring-shaped braking member 32 is secured to the peripheral portion of the disc 35, which faces the brake lever 31. The braking member 32, which is provided with a plurality of tongue-shaped projections 36 radially formed on the outer periphery of the braking member 32, is secured to the disc 35 by means of screws. A pressing force is always applied to the disc 35 by means of a coil spring 37 fitted on the spool-supporting member 34 so that the disc 35 is slid away from the brake lever 31. On the left-hand side plate 2, there are provided a plurality of cam pieces 38 for receiving the projections 36 of the braking member 32 from behind, which is urged through the pressing force by the coil spring 37. The cam pieces 38 are formed on the partial portions of the outer periphery of the braking member 32 so as to correspond to the projections 36. Each of the cam pieces 38 has a slant, which is inclined at a prescribed angle in a circumferential direction of the braking member 32. As a result, the turning of the disc 35 around the boss-shaped base portion 22a causes the projections 36 to move on the surface of the cam pieces 38, leading to the movement of the braking member 32 in the axial direction of the boss-shaped base portion 22a.

The upper side of the rotation axis L of the disc 35 as shown in FIG. 1 shows the condition that the disc 35 approaches the brake lever 31 so that the braking member 32 comes into contact with the brake lever 31. The lower side of the rotation axis L of the disc 35 as shown in FIG. 1 shows the other condition that the disc 35 slides away from the brake lever 31 so that the braking member 32 does not come into contact with the brake lever 31. The turning of the disc 35 around the boss-shaped base portion 22a is caused by operation of a knob 39, which is rotatably supported on the side plate 2. The knob 39 has at its end a gear 40 secured thereto, which engages with another gear 41 formed on the central portion of the disc 35, so that the turning of the knob 39 causes the disc 35 to be turned around the boss-shaped base portion 22a.

The cam pieces 38 and the projections 36 are described to be formed on the side plate 2 and the braking member 32, respectively. They may however be formed inversely, and more specifically, the cam pieces 38 and the projections 36 may be formed on the braking member 32 and the side plate 2, respectively.

Figure 4:
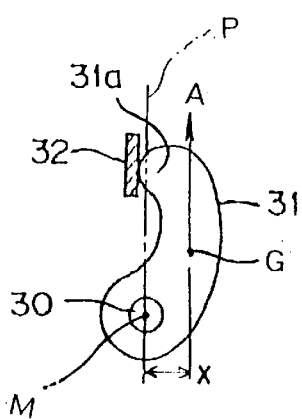
FIG. 4 is an enlarged view illustrating a brake lever of the centrifugal braking apparatus as shown in FIG. 1.

When the braking member 32 approaches the tip end portion 31a of the brake lever 31 by the turning of the knob 39 as shown in FIG. 1 (upper side of the rotation axis L) and FIG. 4, the moment M produced by the centrifugal force A applied to the center of gravity G of the brake lever 31 may be expressed by the formula M=A×x (wherein, x is a horizontal distance between the central axis of the pivot shaft 30 and the center of gravity). It is possible to adjust sequentially the braking force by increasing or decreasing the rotation angle of the knob 39, since the value of "A" is substantially constant, and the value of "x" is variable by the turning of the knob 39.

Description will then be given of operation of the bait-casting reel.

The clutch mechanism is kept on in the "ON" condition in which the male portion and female portions of which the meshing portion 13 is composed are engaged with each other, unless the clutch lever 16 is pushed down, as shown in FIG. 1. In such a condition, the force given by the turning of the handle 7 is transmitted to the spool 4 through the master gear 9, the pinion 12, the clutch cam 15 and the like, with the result that the spool 4 is rotated, and the fishing line is wound onto the spool 4.

When the clutch lever 16 is pushed down by a finger to keep the male portion of the meshing portion 13 away from the female portion thereof to make the disengagement of the pinion 12 from the spool 4, the free rotation of the spool 4 is permitted, with the result that the fishing line can be paid out from the spool body 4a by the weight of rigs such as a lure, a sinker or the like. In this case, when the spool 4 is overrun, backlash occurs. In order to prevent the occurrence of the backlash, the braking force applied to the spool 4 is adjusted by properly operating the mechanical braking apparatus and the centrifugal braking apparatus.

More specifically, the turning of the adjusting knob 29 of the mechanical braking apparatus causes the force by which the spool 4 is held between the pinion shaft 8 and the spool-supporting member 34, to be increased or decreased, thus making a relatively rough adjustment of the mechanical braking force applied to the spool 4.

The operation of the knob 39 of the centrifugal braking apparatus causes the centrifugal braking force applied to the spool 4 to be adjusted.

More specifically, when the braking member 32 is shifted to the right-hand direction along the rotation axis L of the spool 4 by the turning of the knob 39, as shown in FIG. 4, the center of gravity G of the brake lever 31 is moved in the right-hand direction, with the result that the value of "x" in the above-described formula is increased, and the larger moment of force produced by the centrifugal force of the brake lever 31 is applied to the braking member 32.

When the braking member 32 is shifted to the left-hand direction along the rotation axis L of the spool 4 by the turning of the knob 39 in the opposite direction, the center of gravity G of the brake lever 31 is moved in the left-hand direction, with the result that the value of "x" in the above-described formula is decreased, and the smaller moment of force produced by the centrifugal force of the brake lever 31 is applied to the braking member 32. Thus, a fine adjustment of the centrifugal braking force can be made.

When the mechanical and centrifugal braking forces are adjusted in this manner, it is possible to prevent the spool 4 from being overrun to solve the problem of occurrence of backlash.

Second Embodiment

Figure 5:
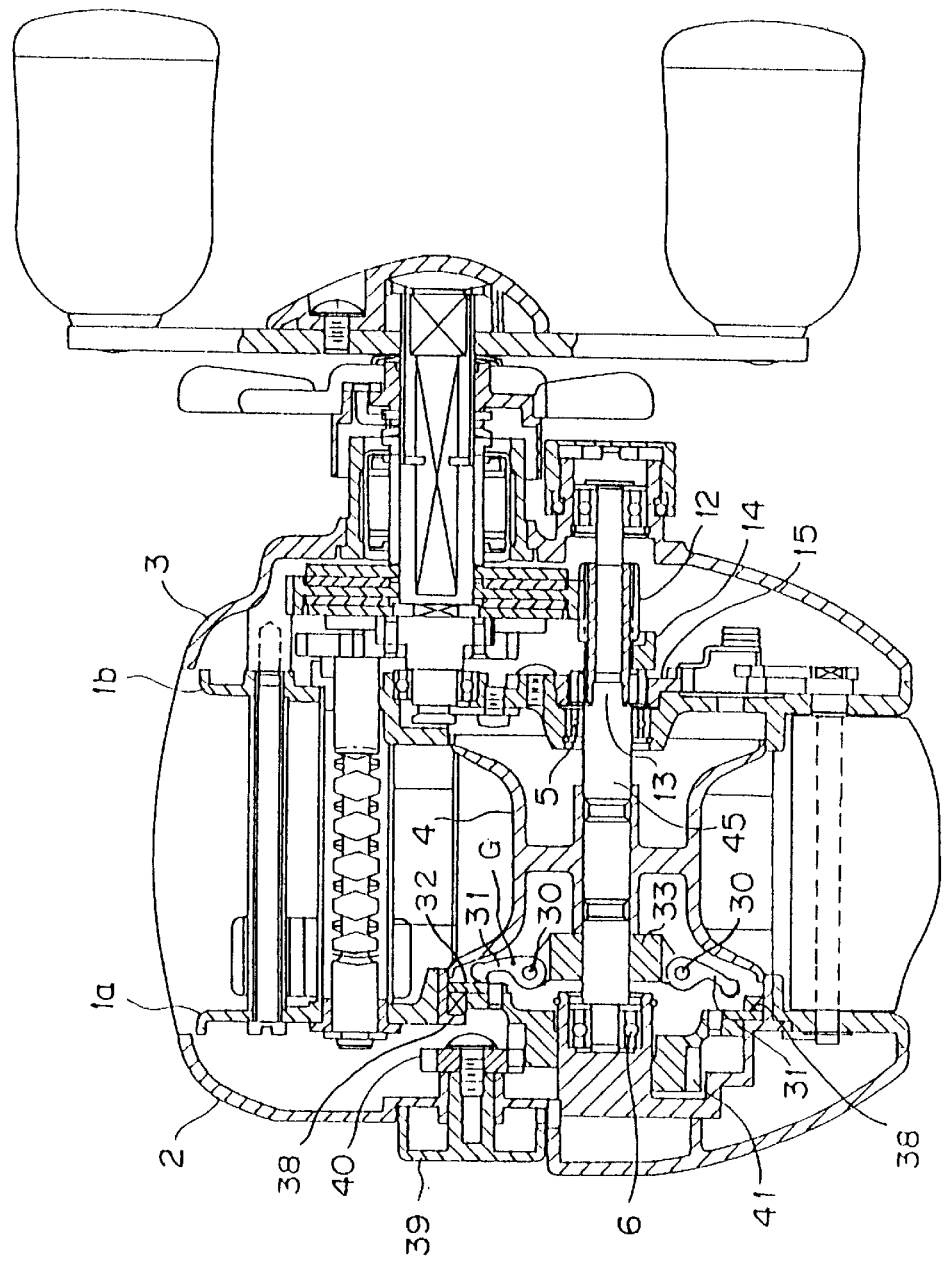
FIG. 5 is a horizontal cross-sectional view illustrating a baitcasting reel provided with a centrifugal braking apparatus of the second embodiment of the present invention.

In the second embodiment of the centrifugal braking apparatus for a baitcasting reel, the brake lever 31 is secured through a bracket 33 to the spool shaft 45, to which the spool 4 is fixed, so as to be rotatable together with the spool shaft 45, as shown in FIG. 5.

In this embodiment, the spool shaft 45 is supported between the left-hand side plate 2 and the right-hand frame plate 1b by the bearings 6, 5. The centrifugal braking apparatus of the present invention can be applied to the baitcasting reel in which the spool shaft 45 is supported between the left and right-hand frame plates 1a, 1b, or the spool shaft 45 is supported between the left and right-hand side plates 2, 3, or the spool shaft 45 to which the spool 4 is rotatably supported is stationarily secured to the reel main body.

Third Embodiment

Figure 6:
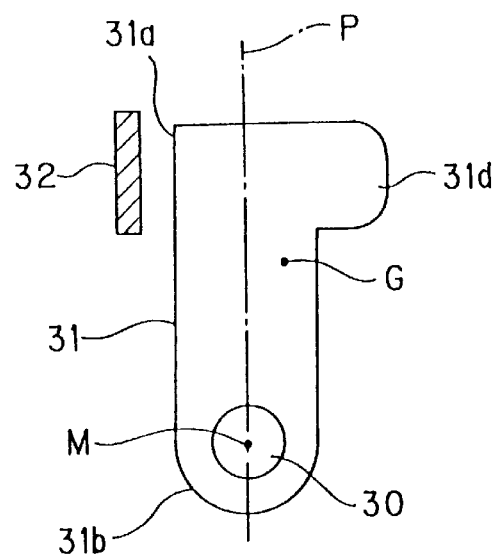
FIG. 6 is a side view illustrating a modified brake lever used in a centrifugal braking apparatus of the third embodiment of the present invention.

In the third embodiment of the centrifugal braking apparatus for a baitcasting reel, the brake lever 31 has a straight arm-shape so that the portion thereof facing the braking member 32 serves as a tip end portion 31a, which is to be brought into contact with the braking member 32, as shown in FIG. 6. The tip end portion 31a of the brake lever 31 is radially directed outwardly from the rotation axis L of the spool 4.

On the opposite side to the tip end portion 31a of the brake lever 31, there is formed a projecting portion 31d, which projects toward the spool 4. The existence of the projecting portion 31d causes the center of gravity G of the brake lever 31 to be shifted to the opposite side to the braking member 32 relative to a standard plane P, which includes the central axis M of the pivot shaft 30 and is perpendicular to the rotation axis L of the spool 4.

The above-mentioned brake lever 31 is supported on the baitcasting reel described in the first and second embodiments by means of the pivot shaft 30, so as to provide the same braking functions.

Fourth Embodiment

Figure 7:
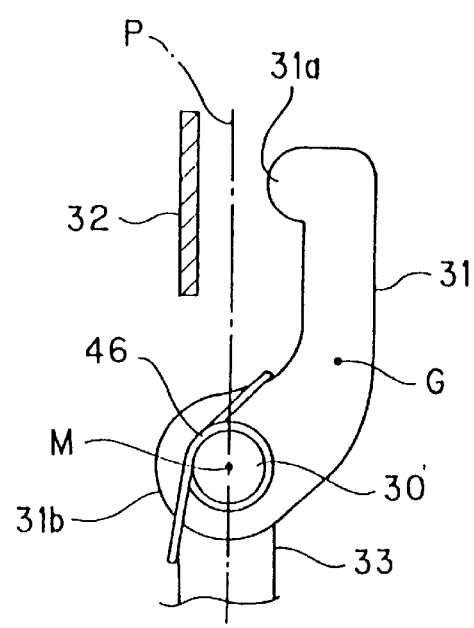
FIG. 7 is a side view illustrating a modified brake lever used in a centrifugal braking apparatus of the fourth embodiment of the present invention.

In the fourth embodiment of the centrifugal braking apparatus for a baitcasting reel, a swing-regulating means for making regulation of a swing motion of the brake lever 31 under the function of the centrifugal force produced by the rotation of the spool 4 is mounted on the brake lever 31 as shown in FIG. 7. The swing-regulating means is composed of a torsion spring 46, which imparts a resilient force to the brake lever 31 so as to keep the tip end portion 31a away from the braking member 32. The torsion spring 46 is mounted on the pivot shaft 30 so that the both ends of the torsion spring 46 are engaged with the bracket 33 and the brake lever 31, respectively.

When the spool 4 rotates to apply the centrifugal force to the brake lever 31, the brake lever 31 is swung counter-clockwise in FIG. 7 against the resiliency of the torsion spring 46, so as to be brought into contact with the braking member 32, thus generating the appropriate centrifugal braking force relative to the spool 4.

Fifth Embodiment

Figure 8:
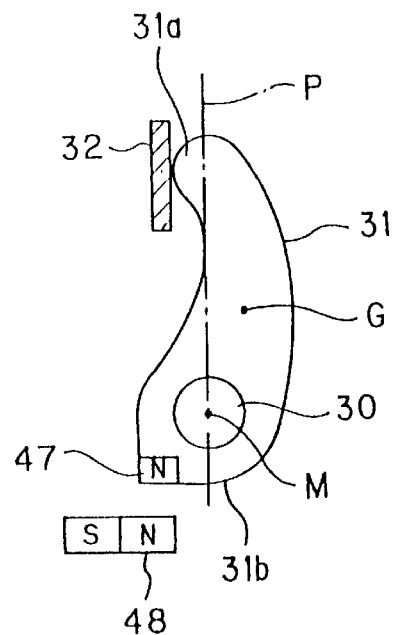
FIG. 8 is a side view illustrating a modified brake lever used in a centrifugal braking apparatus of the fifth embodiment of the present invention.

In the fifth embodiment of the centrifugal braking apparatus for a baitcasting reel, the swing-regulating means for the brake lever 31 is composed of a pair of magnets in replacement of the torsion spring 46 of the fourth embodiment, as shown in FIG. 8. More specifically, the magnets 47, 48 are mounted on a portion of the brake lever 31 and a portion of the bracket 33 (refer to FIGS. 1 and 5), which portions face to each other so that the same poles of the magnets 47, 48 face to each other to cause repulsion. A force given by the repulsion of the magnets 47, 48 is imparted to the brake lever 31 so that the tip end portion 31a thereof is moved away from the braking member 32 (i.e., in a clockwise direction in FIG. 8).

When the spool 4 rotates to apply the centrifugal force to the brake lever 31, the brake lever 31 is swung counter-clockwise in FIG. 8 against the repulsion of the magnets 47, 48, so as to be brought into contact with the braking member 32, thus generating the appropriate centrifugal braking force relative to the spool 4.

Sixth Embodiment

In the sixth embodiment of the centrifugal braking apparatus for a baitcasting reel, an adjusting means for making adjustment of the pressing force of the brake lever 31 against the braking member 32 is provided for the brake lever 31. More specifically, magnets 50, 51 are mounted on a portion of the brake lever 31 and a portion of a movable member 49, respectively, which portions face to each other so that the same poles of the magnets 50, 51 face to each other to cause repulsion. A force given by the repulsion of the magnets 50, 51 is imparted to the brake lever 31 so that the tip end portion 31a thereof is moved away from the braking member 32 (i.e., in a clockwise direction in FIG. 9). The movable member 49 is disposed on the side plate 2 and is composed on the basis of the same mechanism as the disc 35, which is shifted by the operation of the knob 39, as described in the first embodiment. When the movable member 49 is shifted in any one of opposite directions of arrow in FIG. 9 to increase or decrease the repulsion of the magnets 50, 51, it is possible to adjust the centrifugal braking force generated by the contact of the brake lever 31 with the braking member 32.

Figure 9:
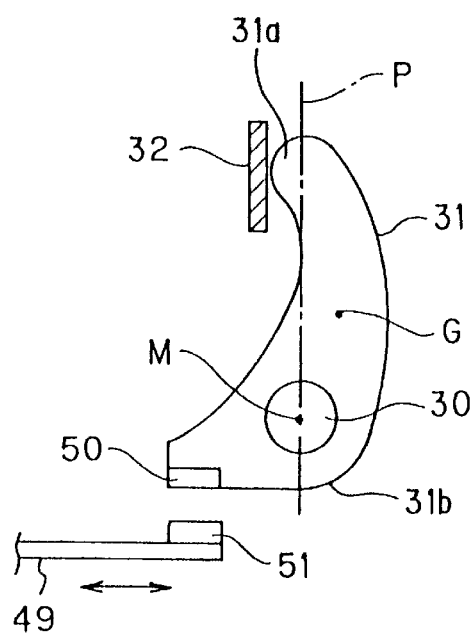
FIG. 9 is a side view illustrating a modified brake lever used in a centrifugal braking apparatus of the sixth embodiment of the present invention.

When the spool 4 rotates to apply the centrifugal force to the brake lever 31, the brake lever 31 is swung counterclockwise in FIG. 9 against the repulsion of the magnets 50, 51, which has been adjusted by means of the adjusting means, so that the tip end portion 31a of the brake lever 31 comes into contact with the braking member 32, thus generating the appropriate centrifugal braking force relative to the spool 4.

The above-mentioned pair of magnets 50, 51 may be substituted by a set of a magnet and a member to be attracted thereby. In this case, the magnet and the member to be attracted thereby are arranged so as to generate the moment having a function of turning clockwise the brake lever 31 in FIG. 9. For example, the movable member 49 is extended toward the vertical line passing through the center of gravity G of the brake lever 31, the magnet is secured to the thus extended end portion of the movable member 49, and the member to be attracted by the magnet is secured to the brake lever 31 so that there is a magnetic attraction between the magnet and the member to be attracted thereby. A force given by the magnetic attraction between them is imparted to the brake lever 31 so that the tip end portion 31a thereof is moved away from the braking member 32.

Seventh Embodiment

Figure 10:
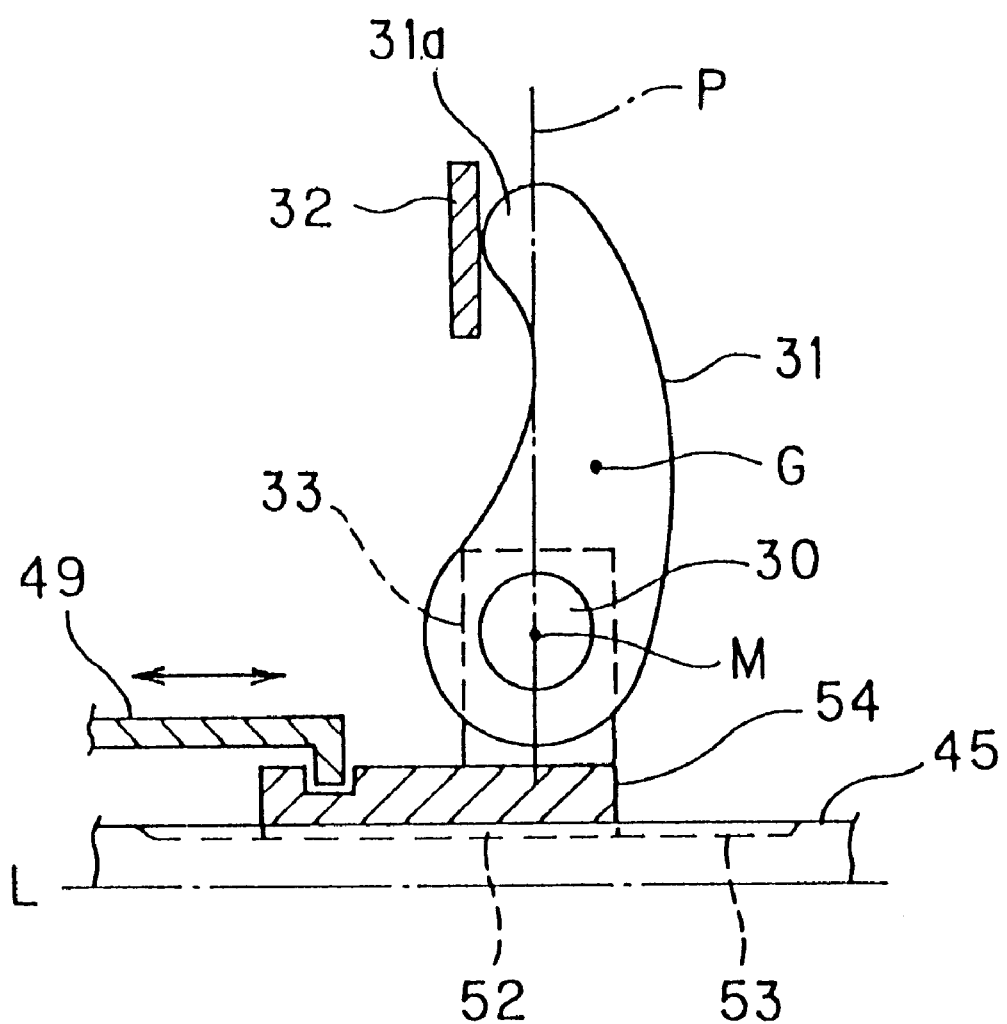
FIG. 10 is a side view illustrating a modified brake lever used in a centrifugal braking apparatus of the seventh embodiment of the present invention.

In the seventh embodiment of the centrifugal braking apparatus for a baitcasting reel, the brake lever 31 is disposed on the rotation axis 45, which is rotated together with the spool 4 (refer to FIG. 5). The brake lever 31 can be shifted in a direction of the rotation axis L (the left and right-hand directions in FIG. 10) by means of a pivot shaft-adjusting means, as shown in FIG. 10.

More specifically, the rotation shaft 45 is fitted into the tubular shaft 54 through a key groove 53 and a key 52 formed the rotation shaft 45 and the tubular shaft 54, respectively. The brake lever 31 is connected to the above-mentioned tubular shaft 54 through the bracket 33 and the pivot shaft 30. Accordingly, the brake lever 31 can be rotated together with the spool 4. A movable member 49, which can be operated by the similar mechanism with that described in the sixth embodiment, is engaged with the tubular shaft 54 so that the tubular shaft 54 can be shifted on the rotation shaft 45 in the axial direction L thereof by means of the movable member 49. Such a shift of the tubular shaft 54 permits adjustment of the centrifugal braking force applied to the spool 4.

Eighth Embodiment

Figure 11:
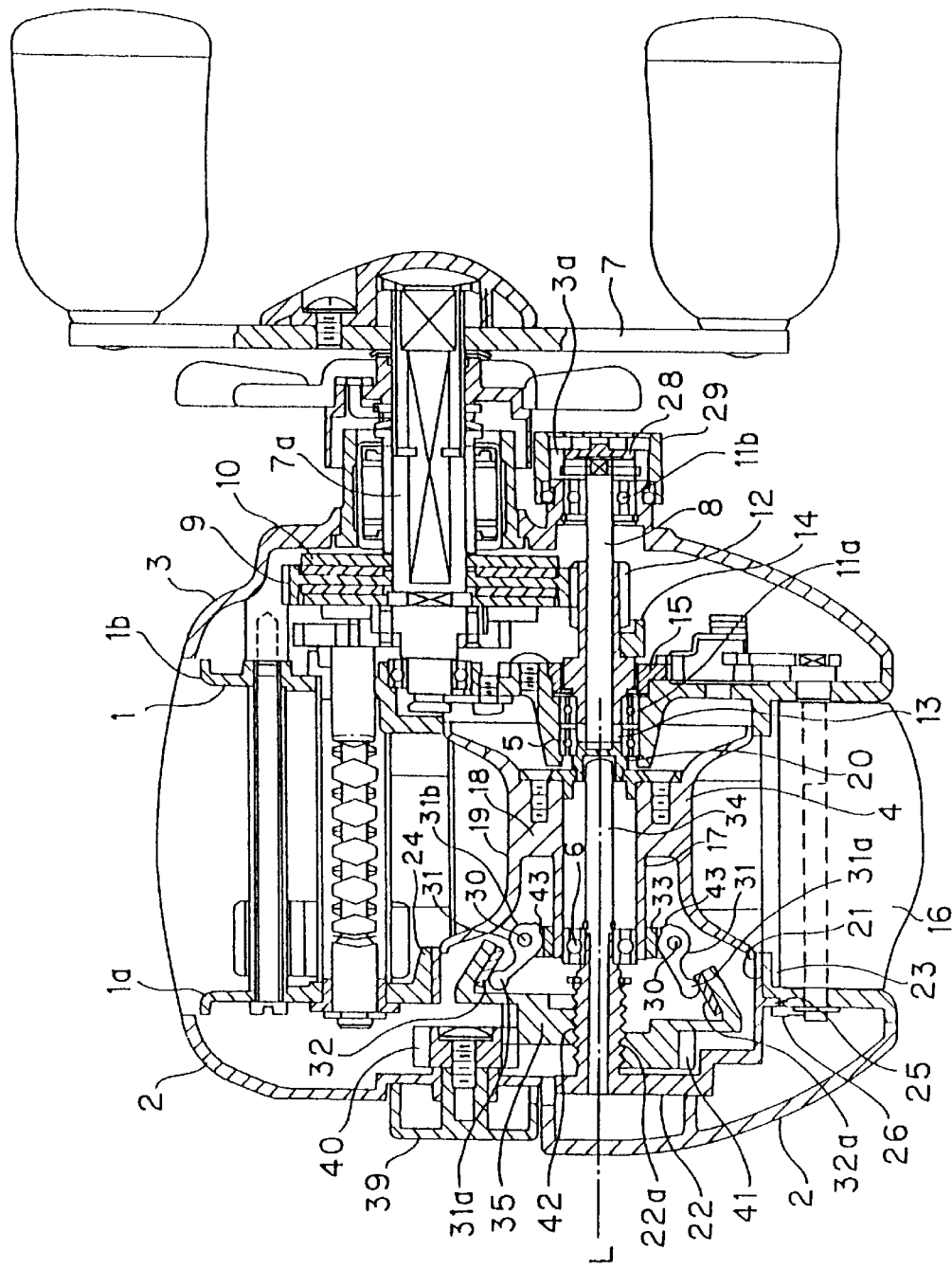
FIG. 11 is a horizontal cross-sectional view illustrating a baitcasting reel provided with a centrifugal braking apparatus of the eighth embodiment of the present invention.

A baitcasting reel for fishing is provided with a reel frame body 1 having left and right-hand frame plates 1a, 1b, to which side plates 2, 3 are secured, respectively, as shown in FIG. 11. A spool 4 on which a fishing line is to be wound is rotatably supported between the right-hand frame plate 1b and the left-hand side plate 2.

The spool 4 is connected to a handle 7 through a driving force transmission means described below so as to be rotatable by means of the handle 7. More specifically, a handle shaft 7a and a pinion shaft 8 are rotatably supported in parallel with each other between the frame plate 1b and the side plate 3. The handle 7 is stationarily secured to the above-mentioned handle shaft 7a, the intermediate portion of which has a master gear 9 put thereon through a drag mechanism 10 and the other components, so that the turning of the handle 7 causes the rotation of the master gear 9 through frictional resistance of the drag mechanism 10.

The pinion shaft 8 is arranged on an extended line of the rotational axial line L of the spool 4, and the left-hand end of the pinion shaft 8 is supported on the right-hand frame plate 1b through the bearing 11a, and the right-hand end thereof is supported on the side plate 3 through the bearing 11b. A pinion 12 is put on the above-mentioned pinion shaft 8 so as to be rotatable and slidable thereon, and the pinion 12 is engaged with the above-mentioned master gear 9.

A meshing portion 13 is provided between the left-hand end of the pinion 12 and the right-hand end of the spool 4. The meshing portion 13 which comprises any one of male and female portions formed on the left-hand end of the pinion 12 and the other of the male and female portions formed on the right-hand end of the spool 4, is constructed so that the engagement of the pinion 12 with the spool 4 and the disengagement thereof from the spool 4 can selectively be made by sliding the pinion 12 on the pinion shaft 8 by means of a shifter 14, along with the clockwise or counterclockwise turn of a clutch cam 15 caused by the operation of a clutch mechanism described later.

The engagement of the pinion 12 with the spool 4 by means of the meshing portion 13 to keep the clutch mechanism in an "ON" condition causes inhibition of free rotation of the spool 4 to maintain a condition in which the fishing line cannot be paid out from the spool 4. In such a condition, when the handle 7 is turned in the winding direction of the fishing line, the force given by the turning of the handle 7 is transmitted to the handle shaft 7a, the master gear 9 and the pinion 12 in this order, to cause the spool 4 to be rotated, thus making it possible to wind the fishing line onto the spool 4.

The disengagement of the pinion 12 from the spool 4 by means of the meshing portion 13 to keep the clutch mechanism in an "OFF" condition causes the spool 4 to be freely rotated to maintain the other condition in which the fishing line can be paid out from the spool 4. In such a condition, a casting operation can be carried out to pay out the fishing line from the spool 4 by the weight of rigs such as a lure, a sinker or the like.

The above-mentioned pinion 12 may be arranged rotatably and slidably between the right-hand frame plate 1b and the right-hand side plate 3 by means of bearings respectively provided on these plates 1b, 3, without being put on the pinion shaft 8 mentioned above. Although the pinion shaft 8 is described to be supported by the right-hand frame plate 1b and the right-hand side plate 3, the pinion shaft 8 may be supported by means of the other member separately secured to the right-hand frame plate 1b or the right-hand side plate 3.

The clutch mechanism comprises the known switching device described below. The pinion 12 is fitted into the clutch cam 15 so that the latter can be rotated relative to the former. The clockwise or counterclockwise turn of the clutch cam 15 around the pinion shaft 8 causes the shifter 14 to be slid along the pinion shaft 8 to selectively make the engagement of the pinion 12 with the spool 4 or the disengagement thereof from the spool 4, thereby permitting the transmission of the force given by the turning of the handle 7 to the spool 4 or the release of the transmission thereof.

The shifter 14 is constructed so as to be slidable on the pinion shaft 8 in the axial direction thereof by means of a pin (not shown) provided in the reel frame body 1. A coil spring (not shown) for imparting the constant pressing force to the pinion 12 through the shifter 14 is fitted to the above-mentioned pin so that the engagement of the pinion 12 with the spool 4 by means of the meshing portion 13 can be maintained.

The clutch cam 15 is formed as a solid cam which is rotatably supported on the right-hand frame plate 1b in the vicinity of the pinion 12. The clutch cam 15 is connected to a clutch lever 16 swingably supported between the left-hand frame plate 1a and the right-hand frame plate 1b so as to be operatable by means of the clutch lever 16.

According to the above-described construction, the shifter 14 is kept in a position as shown in FIG. 11 under a function of resiliency of the above-mentioned coil spring (not shown), thus making the engagement of the pinion 12 with the spool 4 by means of the meshing portion 13, unless the clutch lever 16 is pushed down for example by a finger. As a result, the turning of the handle 7 in this condition causes the spool 4 to be rotated in the winding direction.

When the clutch lever 16 is pushed down by means of a finger, the clutch cam 15 is turned, and the shifter 14 is shifted in the right-hand direction in FIG. 11 against the resiliency of the coil spring by means of the cam of the clutch cam 15, to move the pinion 12 in the same direction. As a result, the disengagement of the pinion 12 from the spool 4 by means of the meshing portion 13 is made, thus maintaining a condition in which the spool 4 can freely be rotated. In such a condition, a casting operation can be carried out to pay out the fishing line from the spool 4 by the weight of rigs such as a lure, a sinker or the like.

As shown in FIG. 11, the above-mentioned spool 4 is composed of a tubular shaft 17 and a fishing line-winding portion formed into a hollow cylindrical shape (i.e., a drum-shape), which is coaxially arranged around the tubular shaft 17 and connected thereto by a leg portion 18. The tubular shaft 17 has at its right-hand end a support piece 20 fixed thereto, which is supported on the right-hand frame plate 1b through a bearing 5. The left-hand end of the tubular shaft 17 is supported on the left-hand side plate 2 through a bearing 6. Accordingly, the spool 4 is rotatable by supporting the both ends of the tubular shaft 17 by the bearings 5, 6.

Figure 12:
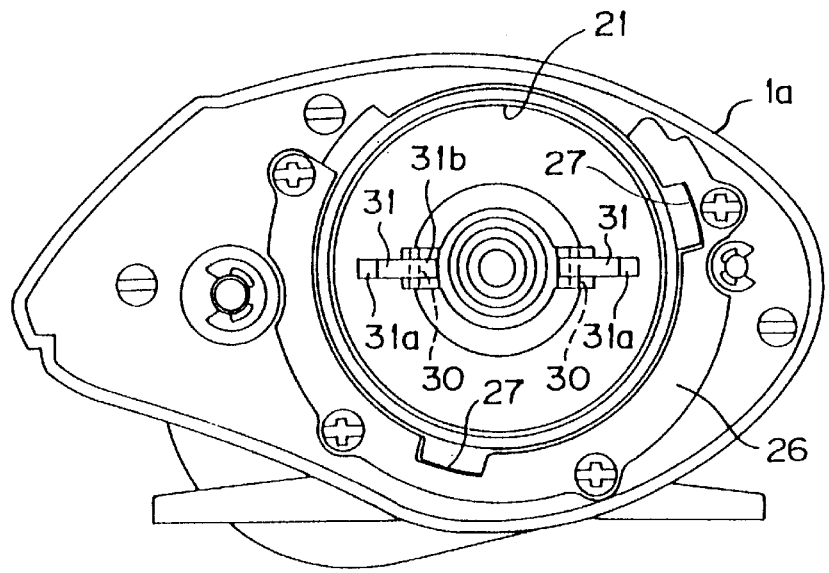
FIG. 12 is a side view of the baitcasting reel as shown in FIG. 11, from which a left-hand side plate is removed.

The above-described spool 4 can be removed from the position between the both frame plates 1a, 1b of the reel frame body 1 in the following manner. More specifically, the support piece 20 at the right-hand end of the spool 4 is inserted into the inner ring of the bearing 5, so as to be removable therefrom. A spool-inserting opening 21 having a diameter slightly larger than the outer diameter of the flange portion of the spool 4 is formed in the left-hand frame plate 1a, and the left-hand side plate 2 is detachably secured to the left-hand frame plate 1a by means of a detachably securing means, as shown in FIGS. 11 and 12.

The left-hand frame plate 1a has, on its portion on which the above-mentioned detachably securing means is arranged, a ring-shaped frame portion 22 integrally formed with the left-hand frame plate 1a. The ring-shaped frame portion 22 has on its periphery a rim 23, which is to be fitted into another rim 24 formed on the periphery of the spool-inserting opening 21 of the left-hand frame plate 1a.

The detachably securing means is composed of engaging projections 25 radially projected from the periphery of the rim 24 of the ring-shaped frame portion 22, and an arch-shaped rocking member 26 having cutouts 27 corresponding to the engaging projections 25, which is disposed around the spool-inserting opening 21 of the left-hand frame plate 1a so that the engaging projections 25 can engage with or disengage from the rocking member 26. The left-hand side plate 2 can be secured to the left-hand frame plate 1a by inserting the engaging projections 25 of the side plate 2 into the cutouts 27 of the rocking member 26 and turning the side plate 2 in one direction relative to the frame plate 1a. The left-hand side plate 2 can be removed from the left-hand frame plate 1a by turning the side plate 2 in the opposite direction relative to the frame plate 1a and pulling out the side plate 2 from the frame plate 1a. Removal of the side plate 2 from the frame plate 1a causes the spool-inserting opening 21 to be exposed, thus permitting the spool 4 to be removed from the spool-inserting opening 21.

A braking force can be applied to the spool 4 by means of a mechanical braking apparatus described below. The mechanical braking apparatus utilizes the pinion shaft 8 to impart a braking force to the spool 4. The pinion shaft 8 is designed as a movable shaft which is movable on the extended line of the rotation axis "L" of the spool 4 by means of a position adjusting means disposed on the right-hand side plate 3. The spool 4 is held between one end of the above-mentioned movable shaft (i.e., the pinion shaft 8) and the left-hand side plate 2 which faces the end of the movable shaft.

The position adjusting means comprises a leaf spring 28 arranged at the right-hand end of the pinion shaft 8 which passes through the right-hand side plate 3, and an adjusting knob 29 having a box nut-shape, which is engaged with the boss 3a formed on the right-hand side plate 3 so as to cover the leaf spring 28 and the right-hand end of the pinion shaft 8. The clockwise or counterclockwise turning of the adjusting knob 24 causes change in resilient force applied by the leaf spring 28, to increase or decrease force by which the spool 4 is held between the pinion shaft 8 and the left-hand side plate 2, thus adjusting a braking force applied to the spool 4. Such a braking force may attenuate a rotational inertia force of the spool 4 during paying out the fishing line from the spool 4, resulting in prevention of occurrence of backlash.

The baitcasting reel is provided with a spool-braking means between the left-hand end of the spool 4 and the left-hand side plate 2 opposing thereto, in addition to the above-described mechanical braking apparatus.

The spool-braking means is constructed as a centrifugal braking apparatus, which comprises brake levers 31 and a ring-shaped braking member 32 as shown in FIGS. 11 and 12. Each of the brake levers 31 has a tip end portion and a root end portion that is pivotably supported by a pivot shaft 30. The pivot shaft 30 is disposed on the spool 4 rotatably supported between the both side plates 1a, 1b of the reel main body. The pivot shaft 30 is arranged apart from the rotation axis L of the spool 4 in a radius direction thereof and extended at right angles to a straight line parallel with the rotation axis L of the spool 4. The ring-shaped braking member 32 is disposed on the above-mentioned left-hand side plate 2 so that the brake lever 31 swung under the function of the centrifugal force produced by rotation of the spool 4 can be brought into contact with the ring-shaped braking member 32.

The pivot shaft 30 is secured to a bracket 33 fixed on the outer periphery of the one end of the tubular shaft 17 of the spool 4. There are provided two pivot shafts 30 at the opposite two positions on the tubular shaft 17 with the rotation axis L of the spool 4 as a central line, and the two pivot shafts 30 are secured to these pivot shafts 30, respectively. Each of the pivot shafts 30 is perpendicular to the rotation axis L of the spool 4, and each of the brake levers 31 can therefore be swung along a plane including the rotation axis L.

The brake lever 31 is stretched outwardly under the function of the centrifugal force produced by rotation of the spool 4, to cause the tip end portion 31a of the brake lever 31 to be come into contact with the inner peripheral surface of the ring-shaped braking member 32.

The braking member 32 is constructed by securing a brake plate onto the inner peripheral surface of a hollow truncated cone-shaped portion, which is formed on the outer periphery of a disc-shaped member 35 disposed on the side plate 2. The brake lever 31 is designed so that the tip end portion 31a thereof can enter the inside of the hollow truncated cone-shaped portion from the top end opening thereof to come into contact with the brake plate.

The above-mentioned braking member 32 is disposed on the left-hand side plate 2 by means of a braking member-adjusting means so that a position of the braking member 32 is adjustable in a direction of the rotation axis L of the spool 4 in the following manner. More specifically, a shaft-shaped spool-supporting member 34 is disposed at the central portion of the ring-shaped frame portion 22 of the left-side plate 2. The spool-supporting member 34 rotatably supports the spool 4 by causing the spool-supporting member 34 to passes through the tubular shaft 17 of the spool 4 and arranging a bearing 6 between the tubular shaft 17 and the spool-supporting member 34. The spool-supporting member 34 is removable from the tubular shaft 17. The disc-shaped member 35 supporting the braking member 32 is connected to a boss-shaped base portion 22a by a screw mechanism 42 so that the disc-shaped member 35 is turned and shifted along the boss-shaped base portion 22a by the turning of the disc-shaped member 35 through the operation of a knob 39 described below. The knob 39 is rotatably supported on the side plate 2, and the operation of the knob 39 causes the rotation of the disc-shaped member 35 around the boss-shaped base portion 22a. The knob 39 is provided at its end with a gear 40 fixed thereto, which engages with another gear 41 formed on the intermediate portion of the disc-shaped member 35. Accordingly, the turning of the knob 39 causes the disc-shaped member 35 to be rotated around the boss-shaped base portion 22a.

The upper side of the rotation axis L of the disc-shaped member 35 as shown in FIG. 11 shows the condition that the disc-shaped member 35 is shifted in the right-hand direction in this figure, and the lower side of the rotation axis L of the disc-shaped member 35 shows the other condition that the disc-shaped member 35 is shifted in the left-hand direction in this figure. As is clear from FIG. 11, the horizontal distance between the central axis of the pivot shaft 30 and the center of gravity of the brake lever 31 brought into contact with the braking member 32 in the condition as shown in the upper side of the rotation axis L of the disc-shaped member 35 as shown in FIG. 11 becomes shorter than that in the other condition as shown in the lower side of the rotation axis L thereof. As a result, when the rotation velocity of the spool 4 is constant, the larger moment of force and the larger braking force can be obtained in the latter condition (i.e., in the condition as shown in the lower side of the rotation axis L) rather than the former condition (i.e., in the condition as shown in the upper side thereof). It is therefore possible to adjust sequentially the braking force by increasing or decreasing the rotation angle of the knob 39.

The centrifugal braking apparatus for a baitcasting reel is provided with a swing-regulating means for making regulation of a swing motion of the brake lever 31 around the pivot shaft 30 under the function of the centrifugal force produced by the rotation of the spool 4. The swing-regulating means is composed of a projection 43 formed on the root end portion 31b of the brake lever 31 so that the projection 43 comes into contact with the base of the bracket 33 to prevent the brake lever 31 from being overturned. According to the above-described swing-regulating means, the brake lever 31 does not dangle when inserting the assembly including the brake levers 31 into the hollow truncated cone-shaped portion for the braking member 32, thus making it possible to easily assemble the parts for the centrifugal braking apparatus. When the braking member 32 is shifted so that the braking member 32 does not come into contact with the brake lever 31, the swing of which is regulated by the swing-regulating means, the centrifugal braking apparatus is kept in a non-operated condition.

Description will then be given of operation of the bait-casting reel.

The clutch mechanism is kept on in the "ON" condition in which the male portion and female portions of which the meshing portion 13 is composed are engaged with each other, unless the clutch lever 16 is pushed down, as shown in FIG. 11. In such a condition, the force given by the turning of the handle 7 is transmitted to the spool 4 through the master gear 9, the pinion 12, the clutch cam 15 and the like, with the result that the spool 4 is rotated, and the fishing line is wound onto the spool 4.

When the clutch lever 16 is pushed down by a finger to keep the male portion of the meshing portion 13 away from the female portion thereof to make the disengagement of the pinion 12 from the spool 4, the free rotation of the spool 4 is permitted, with the result that the fishing line can be paid out from the spool body 4a by the weight of rigs such as a lure, a sinker or the like. In this case, when the spool 4 is overrun, backlash occurs. In order to prevent the occurrence of the backlash, the braking force applied to the spool 4 is adjusted by properly operating the mechanical braking apparatus and the centrifugal braking apparatus.

More specifically, the turning of the adjusting knob 29 of the mechanical braking apparatus causes the force by which the spool 4 is held between the pinion shaft 8 and the spool-supporting member 34, to be increased or decreased, thus making a relatively rough adjustment of the mechanical braking force applied to the spool 4.

The operation of the knob 39 of the centrifugal braking apparatus causes the centrifugal braking force applied to the spool 4 to be adjusted.

More specifically, when the braking member 32 is shifted to the left-hand direction along the rotation axis L of the spool 4 by the turning of the knob 39, as shown in the lower side of the rotation axis L in FIG. 11, the center of gravity G of the brake lever 31 is moved in the left-hand direction in the same figure, with the result that the larger moment of force produced by the centrifugal force of the brake lever 31 is applied to the braking member 32.

When the braking member 32 is shifted to the right-hand direction along the rotation axis L of the spool 4 by the turning of the knob 39 in the opposite direction, as shown in the upper side of the rotation axis L in FIG. 11, the center of gravity G of the brake lever 31 is moved to approach the pivot shaft 30, with the result that the smaller moment of force produced by the centrifugal force of the brake lever 31 is applied to the braking member 32.

When the braking member 32 is shifted on the rotation axis L, it is possible to make fine adjustment of the centrifugal braking force, thus preventing the spool 4 from being overrun to solve the problem of occurrence of backlash.

Ninth Embodiment

The centrifugal braking apparatus of the ninth embodiment for a baitcasting reel is constructed so that the tip end portion 31a of the brake lever 31 can be brought into contact with the inner peripheral surface of a hollow truncated cone-shaped portion, which is formed on the outer periphery of a disc-shaped member 35 disposed on the side plate 2. The hollow truncated cone-shaped portion has a long diameter-opening portion, which is to be located in the vicinity of the spool 4 and a short diameter-connecting portion, which is connected to the outer periphery of the disc-shaped member 35. A brake plate is secured on the inner surface of the hollow truncated cone-shaped portion. The brake lever 31 is arranged in the hollow truncated cone-shaped portion so that the tip end portion 31a of the brake lever 31 can be brought into contact with the above-mentioned brake lever 31.

Figure 13:
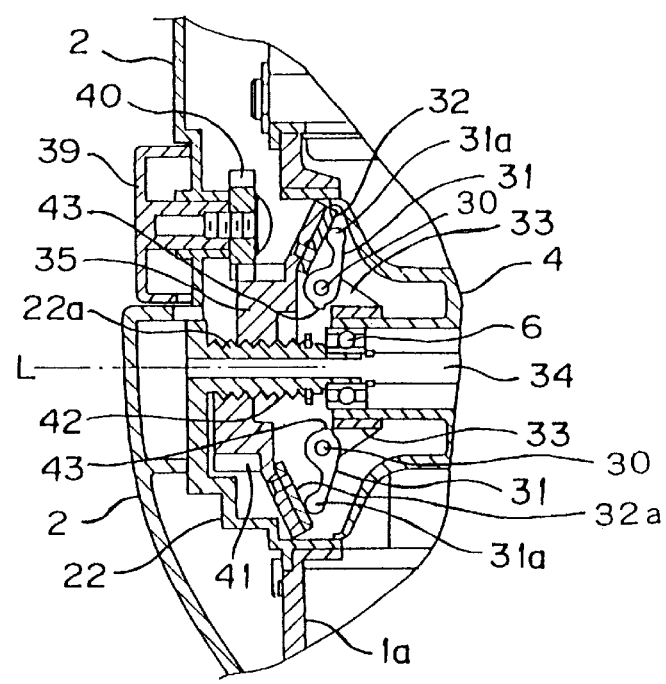
FIG. 13 is a partial sectional-view illustrating a centrifugal braking apparatus of the ninth embodiment of the present invention.

The upper side of the rotation axis L of the disc-shaped member 35 as shown in FIG. 13 shows the condition that the disc-shaped member 35 is shifted in the right-hand direction in this figure, and the lower side of the rotation axis L of the disc-shaped member 35 shows the other condition that the disc-shaped member 35 is shifted in the left-hand direction in this figure. As is clear from FIG. 13, the horizontal distance between the central axis of the pivot shaft 30 and the center of gravity of the brake lever 31 brought into contact with the braking member 32 in the condition as shown in the upper side of the rotation axis L of the disc-shaped member 35 as shown in FIG. 13 becomes longer than that in the other condition as shown in the lower side of the rotation axis L thereof. As a result, when the rotation velocity of the spool 4 is constant, the smaller moment of force and the smaller braking force can be obtained in the latter condition (i.e., in the condition as shown in the lower side of the rotation axis L) rather than the former condition (i.e., in the condition as shown in the upper side thereof).

The disc-shaped member 35 supporting the braking member 32 is connected to a boss-shaped base portion 22a by a screw mechanism 42 so that the disc-shaped member 35 is turned and shifted along the boss-shaped base portion 22a by the turning of the disc-shaped member 35 through the operation of a knob 39 as described in the eighth embodiment.

The brake lever 31 is provided with a projection 43 as a swing-regulating means. The swing motion of the brake lever 31 is limited within a prescribed range by causing the projection 43 to come into contact with the bracket 33.

Tenth Embodiment

Figure 14:
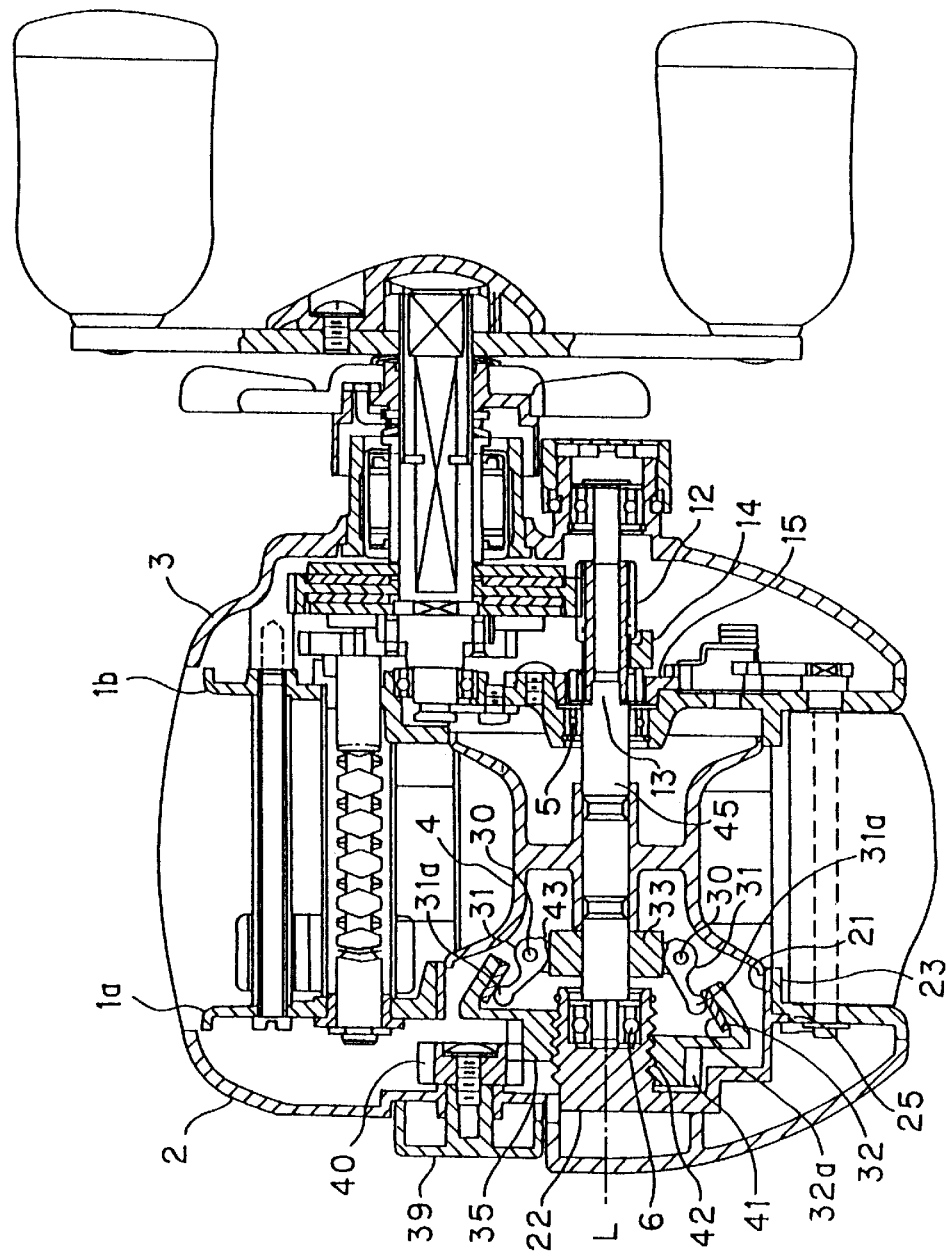
FIG. 14 is a horizontal cross-sectional view illustrating a baitcasting reel provided with a centrifugal braking apparatus of the tenth embodiment of the present invention.
Figure 18:
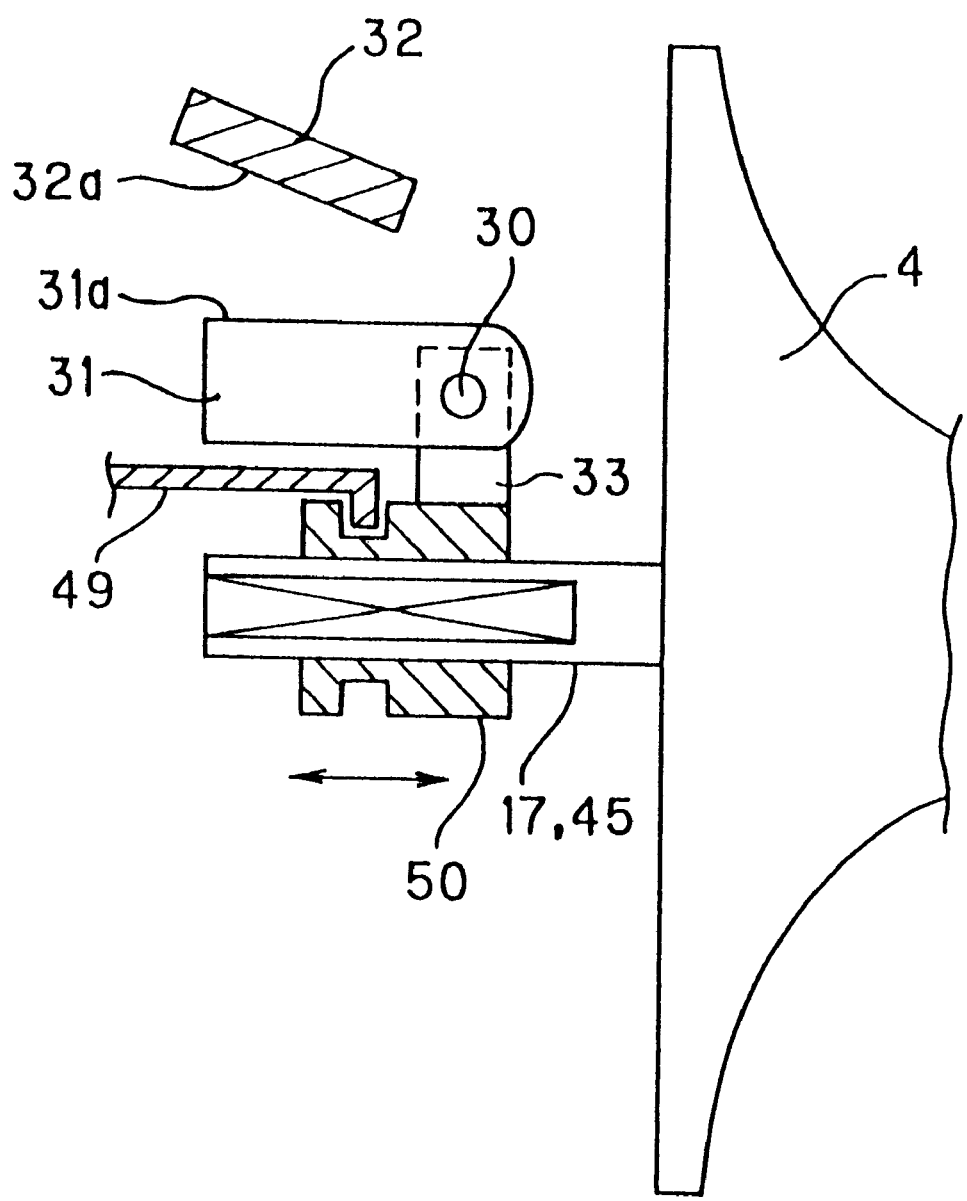
FIG. 18 is a partial sectional-view illustrating a centrifugal braking apparatus of the fourteenth embodiment of the present invention.

In the tenth embodiment of the centrifugal braking apparatus for a baitcasting reel, the brake lever 31 is secured through a bracket 33 to the spool shaft 45, to which the spool 4 is fixed, so as to be rotatable together with the spool shaft 45, as shown in FIG. 14.

In this embodiment, the spool shaft 45 is supported between the left-hand side plate 2 and the right-hand frame plate 1b by the bearings 6, 5. The centrifugal braking apparatus of the present invention can be applied to the baitcasting reel in which the spool shaft 45 is supported between the left and right-hand frame plates 1a, 1b, or the spool shaft 45 is supported between the left and right-hand side plates 2, 3, or the spool shaft 45 to which the spool 4 is rotatably supported is stationarily secured to the reel main body.

Eleventh Embodiment

The centrifugal braking apparatus for a baitcasting reel of the eleventh embodiment is provided with a brake lever 31 as shown in FIG. 15. A swing-regulating means for making regulation of a swing motion of the brake lever 31 under the function of the centrifugal force produced by the rotation of the spool 4 is mounted on the brake lever 31. The swing-regulating means is composed of a torsion spring 46, which imparts a resilient force to the brake lever 31 so as to keep the tip end portion 31a away from the braking member 32 (i.e., in a counterclockwise direction in FIG. 15). The torsion spring 46 is mounted on the pivot shaft 30 so that the both ends of the torsion spring 46 are engaged with the bracket 33 and the brake lever 31, respectively.

When the spool 4 rotates to apply the centrifugal force to the brake lever 31, the brake lever 31 is swung counterclockwise in FIG. 15 against the resiliency of the torsion spring 46, so as to be brought into contact with the inner peripheral surface of the braking member 32, thus generating the appropriate centrifugal braking force relative to the spool 4.

Twelfth Embodiment

The centrifugal braking apparatus of the twelfth embodiment for a baitcasting reel is provided with a brake lever 31 as shown in FIG. 16. For the brake lever 31, there is provided an adjusting means for making adjustment of the pressing force of the brake lever 31 against the braking member 32. More specifically, a magnet 46 and a member 47 such as an iron plate to be attracted thereby are mounted on a portion of the brake lever 31 and a portion of a movable member 49, respectively, which portions face to each other so that the above-mentioned member 47 can be attracted by the magnet 46. A force given by the attraction between the magnet 46 and the member 47 is imparted to the brake lever 31 so that the tip end portion 31a thereof is moved away from the braking member 32 (i.e., in a counterclockwise direction in FIG. 16). The movable member 48 is disposed on the side plate 2 and is composed on the basis of the same mechanism as the disc 35, which is shifted by the operation of the knob 39, as described in the first embodiment. When the movable member 48 is shifted in any one of opposite directions of arrow in FIG. 16 to increase or decrease the attraction between the magnet 46 and the member 47, it is possible to adjust the centrifugal braking force generated by the contact of the brake lever 31 with the braking member 32.

When the spool 4 rotates to apply the centrifugal force to the brake lever 31, the brake lever 31 is swung clockwise in FIG. 16 against the attraction between the magnet 46 and the member 47, which has been adjusted by means of the adjusting means, so that the tip end portion 31a of the brake lever 31 comes into contact with the braking member 32, thus generating the appropriate centrifugal braking force relative to the spool 4.

The positions of the magnet 46 and the member 47 may be interchangeable with each other. The member 47 may be substituted by another magnet, which is arranged so that the magnetic pole thereof faces the magnetic pole of the magnets 46, having the different magnetic polarity from the former.

Thirteenth Embodiment

The centrifugal braking apparatus of the twelfth embodiment for a baitcasting reel is provided with a brake lever 31 as shown in FIG. 17. For the brake lever 31, there is provided an adjusting means for making adjustment of the pressing force of the brake lever 31 against the braking member 32. More specifically, magnets 46a, 46b are mounted on a portion of the brake lever 31 and a portion of a movable member 48, respectively, which portions face to each other so that the same poles of the magnets 46a, 46b face to each other to cause repulsion. A force given by the repulsion of the magnets 46a, 46b is imparted to the brake lever 31 so that the tip end portion 31a thereof is moved away from the inner surface 32a of the braking member 32 (i.e., in a counterclockwise direction in FIG. 17). The movable member 48 is disposed on the side plate 2 and is composed on the basis of the same mechanism as the disc 35, which is shifted by the operation of the knob 39, as described in the first embodiment. When the movable member 48 is shifted in any one of opposite directions of arrow in FIG. 17 to increase or decrease the repulsion of the magnets 46a, 46b, it is possible to adjust the centrifugal braking force generated by the contact of the brake lever 31 with the braking member 32.

When the spool 4 rotates to apply the centrifugal force to the brake lever 31, the brake lever 31 is swung clockwise in FIG. 17 against the repulsion of the magnets 46a, 46b, which has been adjusted by means of the adjusting means, so that the tip end portion 31a of the brake lever 31 comes into contact with the inner surface 32a of the braking member 32, thus generating the appropriate centrifugal braking force relative to the spool 4.

Fourteenth Embodiment

In the fourteenth embodiment of the centrifugal braking apparatus for a baitcasting reel, the brake lever 31 is disposed on the rotation axis 45 or the tubular shaft 17, which is rotated together with the spool 4. The brake lever 31 can be shifted in a direction of the rotation axis L by means of a pivot shaft-adjusting means.

More specifically, the rotation shaft 45 or the tubular shaft 17 is fitted into a sliding tube 50 through engaging portions having non-circular cross-section, which are formed the rotation shaft 45 or the tubular shaft 17 and the sliding tube 50, respectively. The brake lever 31 is connected to the above-mentioned sliding tube 50 through the bracket 33 and the pivot shaft 30. Accordingly, the brake lever 31 can be rotated together with the spool 4. A movable member 49, which can be operated by the similar mechanism with that described in the sixth embodiment, is engaged with the sliding tube 50 so that the sliding tube 50 can be shifted on the rotation shaft 45 in the axial direction L thereof by means of the movable member 49. Such a shift of the tubular shaft 54 permits adjustment of the centrifugal braking force applied to the spool 4.

Fifteenth Embodiment

The centrifugal braking apparatus of the fifteenth embodiment for a baitcasting reel is provided with a brake lever 31 as shown in FIG. 19. At least the tip end portion 31a of the brake lever 31 is formed of any one of hard rubber and hard synthetic resin.

According to such a construction, it is possible to increase the centrifugal braking force and reduce the noise level, when the tip end portion 31a of the brake lever 31 comes into contact with the braking member 32 (refer to FIG. 11).

The brake lever 31 is provided with a swing-regulating means for regulating the swing motion of the brake lever 31 around the pivot shaft 30. More specifically, the brake lever 31 has a projection 43 on the root end portion thereof. The projection 43 comes into contact with the bracket 33, when the brake lever 31 is swung toward the braking member 32 (refer to FIGS. 11, 13 and 14), thus preventing the brake lever 31 from being overturn.

Sixteenth Embodiment

The centrifugal braking apparatus for a baitcasting reel of the sixteenth embodiment is provided with a brake lever 31 as shown in FIG. 20. The brake lever 31 is provided with an additional weight 44 on the curved intermediate portion thereof. It is possible to make a fine adjustment of the pressing force by the brake lever 31, which is applied to the braking member 32, by adjusting the weight of the above-mentioned additional weight 44.

The root end portion 31b of the brake lever 31 is also provided with a projection 43 having the same function as the projection 43 described in the eighth embodiment.

According to the present invention as described in detail, since the centrifugal braking apparatus for a baitcasting reel comprises: a spool rotatably supported between both side plates of a reel main body; at least one pivot shaft disposed on the spool so as to be arranged apart from a rotation axis of the spool in a radius direction thereof and extended at right angles to a straight line parallel with the rotation axis of the spool; at least one brake lever each having a tip end portion and a root end portion that is pivotably supported by the at least one pivot shaft, respectively, so that the tip end portion of the brake lever is movable toward a standard plane, which includes a central axis of the pivot shaft and is perpendicular to the rotation axis of the spool, under a function of centrifugal force produced by rotation of the spool; and a ring-shaped braking member provided on the reel main body so that the tip end portion of the brake lever, which is swung under the function of the centrifugal force produced by rotation of the spool can be brought into contact with the ring-shaped braking member, it is possible not only to impart the braking force in proportion to the centrifugal force to the spool, but also to remarkably increase the braking torque caused by the above-mentioned centrifugal force, thus preventing the occurrence of backlash due to the overrun of the spool.

When there is provided, in the above-mentioned centrifugal braking apparatus, the swing-regulating means for making regulation of a swing motion of the brake lever under the function of the centrifugal force by produced by the rotation of the spool, it is possible to prevent the spool from being overrun by the swing of the brake lever only in case that the centrifugal force exceeds a prescribed value as in the casting of a rig or the paying-out of the fishing line at high speed, to which a rig with a heavy weight is connected. When the centrifugal force is kept under the prescribed value as in the retrieve of the fishing line or the paying-out of the fishing line at low speed, the swing motion of the brake lever is regulated to prevent the brake lever from coming into contact with the braking member, with the result that the smooth retrieve and paying-out of the fishing line can be achieved in a condition that the braking force is not applied to the braking member, and that occurrence of wear of the contacting surface between the brake lever and the braking member can be prevented, thus improving durability of the braking apparatus. In addition, it is possible to prevent the brake lever from being strongly pressed against the braking member by regulating the swing motion of the brake lever, thus solving problems of wear and damage of the brake lever and the braking member, and permitting an easy assembly of the parts for the braking apparatus.

When, in the above-mentioned centrifugal braking apparatus, the swing-regulating means comprises one of a magnet and a member to be attracted thereby, which is provided on the brake lever; and an other of the magnet and the member to be attracted thereby, which is provided on a portion of the reel main body, which faces the one of the magnet and the member to be attracted thereby, it is possible to adjust and change the swing motion activating force for the brake lever and the pressing force applied against the braking member, which forces are generated by the centrifugal force due to the rotation of the spool, thus permitting easy adjustment of the braking force applied to the spool.

When, in the above-mentioned centrifugal braking apparatus, at least a contact surface of the tip end portion of the brake lever, which is to be brought into contact with the braking member is formed of any one of hard rubber and hard synthetic resin, it is possible to increase the braking force by friction so as to prevent securely the occurrence of backlash due to the overrun of the spool, as well as to reduce the noise level caused at the time when the brake lever comes into contact with the braking member.

When, in the above-mentioned centrifugal braking apparatus, the tip end portion of the brake lever is positioned between an end surface of the spool and the standard plane so that the tip end portion of the brake lever can be moved toward the standard plane, to be brought into contact with a side surface of the ring-shaped braking member under the function of the centrifugal force produced by rotation of the spool, it is possible to cause the braking member to approach the end of the spool.

When, in the above-mentioned centrifugal braking apparatus, the brake lever has center of gravity, which exists beyond a straight line connecting the central axis of the pivot shaft and the tip end portion of the brake lever and dividing the brake lever into a spool-side area and a reel-main-body-side area, and exists on the spool-side area; and the tip end portion of the brake lever is movable beyond the standard plane under the function of the centrifugal force produced by rotation of the spool to be brought into contact with the braking member, it is possible to make fine adjustment of the braking force.

When, in the above-mentioned centrifugal braking apparatus, the braking member with which the tip end portion of the brake lever is to be brought into contact is disposed on the reel main body by means of a braking member-adjusting means for making a position adjustment of the braking member in a direction of the rotation axis of the spool, it is possible to adjust the swing angle of the brake lever, with the result that the rotation velocity of the spool to which the braking force is to be applied can be set as desired. When the pivot shaft can be shifted, the brake lever is disposed so as to swing from the side of the spool to the side of the side plate along with the rotation of the spool, with the result that the flange of the spool, the brake lever, the ring-shaped braking member and the side plate are placed in this order from the side of the spool to the side of the side plate, thus leading to an easy assembly of the parts for the braking apparatus, and an easy exchanging operation of the spool.

When, in the above-mentioned centrifugal braking apparatus, the tip end portion of the brake lever is positioned between the braking member and the rotation axis of the spool so that the tip end portion of the brake lever can be moved toward the ring-shaped braking member, to be brought into contact with an inner peripheral surface of the braking member under the function of the centrifugal force produced by rotation of the spool, it is possible to increase the braking force applied to the spool in proportion to the centrifugal force produced by the rotation of the spool, thus preventing the occurrence of backlash due to the overrun of the spool. The tip end portion of the brake lever can come into contact with the inner surface of the ring-shaped braking member under the function of centrifugal force produced by the rotation of the spool, a stable braking force can be obtained even when wear of the contact surface of the brake lever and the braking member occurs. Since the tip end portion of the brake lever is brought into contact with the inner surface of the ring-shaped braking member, a grinding treatment applied to the inner surface of the ring-shaped braking member suffices, thus leading to easy manufacture thereof.

When, in the above-mentioned centrifugal braking apparatus, the braking member with which the tip end portion of the brake lever is to be brought into contact, or the pivot shaft by which the brake lever is pivotably supported, is disposed on the reel main body by means of a braking member-adjusting means for making a position adjustment of the braking member in a direction of the rotation axis of the spool; and the braking member has a tapered inner surface, a diameter of which is gradually increased in a direction of the rotation axis of the spool, the shift of the ring-shaped braking member in the rotation axis causes change in distance between the tip end portion of the brake lever and the rotation axis, thus making it possible to increase and decrease the braking torque in accordance with the rotational velocity of the spool, thus preventing reliably the spool from being overrun. More specifically, it is possible to adjust the distance between the rotation axis and the tip end portion of the brake lever to be swung under the function of centrifugal force produced by the rotation of the spool, with the result that the braking force applied to the spool can easily be set in accordance with the rotational velocity of the spool. The braking member can be shifted in the axial direction of the spool by means of the braking member-adjusting means disposed on the side plate of the reel main body, and the braking torque can therefore be set from the outside of the side plate. The brake lever can be shifted in the axial direction of the spool by means of the pivot shaft-adjusting means disposed on the side plate, and the braking force can therefore be set from the outside of the side plate.

What is claimed is:

1. A centrifugal braking apparatus for a baitcasting reel, which comprises:

a spool rotatably supported between both side plates of a reel main body;

at least one pivot shaft disposed on said spool so as to be arranged apart from a rotation axis of said spool in a radius direction thereof and extended at right angles to a straight line parallel with the rotation axis of said spool;

at least one brake lever each having a tip end portion and a root end portion that is pivotably supported by said at least one pivot shaft, respectively, so that said tip end portion of said brake lever is movable toward a standard plane, which includes a central axis of said pivot shaft and is perpendicular to the rotation axis of said spool, under a function of centrifugal force produced by rotation of said spool; and a ring-shaped braking member provided on said reel main body so that the tip end portion of said brake lever, which is swung under the function of the centrifugal force produced by rotation of said spool can be brought into contact with said ring-shaped braking member, the tip end portion of said brake lever being positioned between an end surface of said spool and said standard plane so that the tip end portion of said brake lever can move toward said standard plane, to be brought into contact with a side surface of said ring-shaped braking member under the function of the centrifugal force produced by rotation of said spool.

2. An apparatus as claimed in claim 1, wherein:

said brake lever is provided with a swing-regulating means for regulation of a swing motion of said brake lever under the function of the centrifugal force produced by the rotation of said spool.

3. An apparatus as claimed in claim 2, wherein:

said swing-regulating means comprises one of a magnet and a member to be attracted thereby, which is provided on said brake lever; and the other of said magnet and said member to be attracted thereby, which is provided on a portion of said reel main body, which faces said one of the magnet and the member to be attracted thereby.

4. An apparatus as claimed in claim 1, wherein:

at least a contact surface of the tip end portion of said brake lever, which is to be brought into contact with said braking member, is formed of any one of hard rubber and hard synthetic resin.

5. An apparatus as claimed in claim 1, wherein:

said brake lever has a center of gravity, which extends beyond a straight line connecting the central axis of said pivot shaft and the tip end portion of said brake lever and dividing said brake lever into a spool-side area and a reel-main-body-side area, and exists on said spool-side area; and the tip end portion of said brake lever is movable beyond said standard plane under the function of the centrifugal force produced by rotation of said spool to be brought into contact with said braking member.

6. An apparatus as claimed in claim 1, wherein:

said braking member with which the tip end portion of said brake lever is to be brought into contact is disposed on said reel main body by means of a braking member-adjusting means for making a position adjustment of said braking member in a direction of said rotation axis of said spool.

7. An apparatus as claimed in claim 1, wherein:

said pivot shaft by which said brake lever is pivotably supported is disposed on said spool so as to be revolvable, along with rotation of said spool, around the rotation axis of said spool and to be slidable in a direction of the rotation axis thereof; and said pivot shaft is disposed on said reel main body by means of a pivot shaft-adjusting means for making a position adjustment of said pivot shaft in a direction of said rotation axis of said spool.

8. A centrifugal braking apparatus for a baitcasting reel, which comprises:

a spool rotatably supported between both side plates of a reel main body;

at least one pivot shaft disposed on said spool so as to be arranged apart from a rotation axis of said spool in a radius direction thereof and extended at right angles to a straight line parallel with the rotation axis of said spool;

at least on brake lever each having a tip end portion and a root end portion that is pivotably supported by said at least one pivot shaft, respectively, so that said tip end portion of said brake lever is movable toward a standard plane, which includes a central axis of said pivot shaft and is perpendicular to the rotation axis of said spool, under a function of centrifugal force produced by rotation of said spool; and a ring-shaped braking member provided on said reel main body so that the tip end portion of said brake lever, which is swung under the function of the centrifugal force produced by rotation of said spool can be brought into contact with said ring-shaped braking member;

the tip end portion of said brake lever is positioned between said braking member and the rotation axis of said spool so that the tip end portion of said brake lever can be moved toward said ring-shaped braking member, to be brought into contact with an inner peripheral surface of said braking member under the function of the centrifugal force produced by rotation of said spool;

said pivot shaft by which said brake lever is pivotably supported is disposed on said spool so as to be revolvable, along with rotation of said spool, around the rotation axis of said spool and to be slidable in a direction of the rotation axis thereof;

said pivot shaft is disposed on said reel main body by means of a pivot shaft-adjusting means for making a position adjustment of said pivot shaft in a direction of said rotation axis of said spool; and said braking member has a tapered inner surface, a diameter of which is gradually increased in a direction of said rotation axis of said spool.

* * * * *